(12) United States Patent
Noske

(10) Patent No.: US 10,954,749 B2
(45) Date of Patent: Mar. 23, 2021

(54) BIDIRECTIONAL DOWNHOLE ISOLATION VALVE

(71) Applicant: Weatherford Technology Holdings, LLC, Houston, TX (US)

(72) Inventor: Joe Noske, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 187 days.

(21) Appl. No.: 16/150,549

(22) Filed: Oct. 3, 2018

(65) Prior Publication Data

US 2019/0032452 A1 Jan. 31, 2019

Related U.S. Application Data

(63) Continuation of application No. 15/645,778, filed on Jul. 10, 2017, now Pat. No. 10,138,710, which is a continuation of application No. 14/313,089, filed on Jun. 24, 2014, now Pat. No. 10,132,137.

(60) Provisional application No. 61/839,447, filed on Jun. 26, 2013.

(51) Int. Cl.
  *E21B 34/14* (2006.01)
  *E21B 21/10* (2006.01)
  *E21B 34/10* (2006.01)
  *F16K 3/03* (2006.01)

(52) U.S. Cl.
  CPC .............. *E21B 34/14* (2013.01); *E21B 21/10* (2013.01); *E21B 34/10* (2013.01); *F16K 3/03* (2013.01); *E21B 2200/05* (2020.05)

(58) Field of Classification Search
  CPC .......... E21B 34/14; E21B 21/10; E21B 34/10; E21B 2034/005; F16K 3/03
  See application file for complete search history.

(56) References Cited

U.S. PATENT DOCUMENTS

| | | |
|---|---|---|
| 3,787,022 A | 1/1974 | Wilcox |
| 3,887,158 A | 6/1975 | Polk |
| 5,197,553 A | 3/1993 | Leturno |
| 6,209,663 B1 | 4/2001 | Hosie |
| 6,230,808 B1 | 5/2001 | French et al. |
| 6,328,109 B1 | 12/2001 | Pringle et al. |
| 6,401,826 B2 | 6/2002 | Patel |
| 6,508,309 B1 | 1/2003 | French |

(Continued)

FOREIGN PATENT DOCUMENTS

| | | |
|---|---|---|
| FR | 1147940 A | 12/1957 |
| GB | 2487292 A | 7/2012 |

OTHER PUBLICATIONS

Canadian Office Action in related application CA 2990911 dated Apr. 29, 2020.

(Continued)

*Primary Examiner* — Yong-Suk (Philip) Ro
(74) *Attorney, Agent, or Firm* — Patterson + Sheridan, LLP

(57) ABSTRACT

A method of drilling a wellbore includes deploying a drill string into the wellbore through a casing string disposed in the wellbore casing string having an isolation valve. The method also includes drilling the wellbore into a formation by injecting drilling fluid through the drill string and rotating a drill bit of the drill sting and retrieving the drill string from the wellbore until the drill bit is above one or more valve members of the isolation valve. The method further includes closing the valve members, thereby bidirectionally isolating the formation from an upper portion of the wellbore.

15 Claims, 18 Drawing Sheets

(56) References Cited

U.S. PATENT DOCUMENTS

| | | |
|---|---|---|
| 6,782,948 B2 | 8/2004 | Echols et al. |
| 7,673,689 B2 | 3/2010 | Jackson et al. |
| 7,730,968 B2 | 6/2010 | Hosie et al. |
| 7,762,336 B2 | 7/2010 | Johnson et al. |
| 7,789,156 B2 | 9/2010 | Pia |
| 8,006,772 B2 | 8/2011 | Nazir et al. |
| 8,261,836 B2 | 9/2012 | Noske et al. |
| 8,579,027 B2 | 11/2013 | Abdelmalek et al. |
| 9,133,688 B2 | 9/2015 | Jancha et al. |
| 9,334,700 B2 | 5/2016 | Hanson et al. |
| 2003/0173091 A1 | 9/2003 | Horne et al. |
| 2004/0251032 A1 | 12/2004 | Luke et al. |
| 2005/0056429 A1 | 3/2005 | Du et al. |
| 2005/0230118 A1 | 10/2005 | Noske et al. |
| 2006/0124311 A1 | 6/2006 | Lopez de Cardenas et al. |
| 2007/0095546 A1 | 5/2007 | Farquhar et al. |
| 2007/0284119 A1 | 12/2007 | Jackson et al. |
| 2008/0210431 A1 | 9/2008 | Johnson et al. |
| 2009/0229829 A1 | 9/2009 | Lloyd et al. |
| 2009/0230340 A1 | 9/2009 | Purkis |
| 2009/0272539 A1 | 11/2009 | Lloyd et al. |
| 2010/0301242 A1 | 12/2010 | Patton et al. |
| 2011/0232916 A1 | 9/2011 | Maldonado |
| 2011/0297396 A1 | 12/2011 | Hendel et al. |
| 2012/0067595 A1 | 3/2012 | Noske et al. |
| 2012/0234558 A1 | 9/2012 | Godfrey et al. |
| 2014/0202768 A1 | 7/2014 | Noske |

OTHER PUBLICATIONS

PCT International Search Report and Written Opinion dated Oct. 23, 2015, for International Application No. PCT/US2014/044420.

Australian Patent Examination Report dated Mar. 22, 2016, for Australian Patent Application No. 2014302291.

Canadian Office Action dated Nov. 3, 2016, for Canadian Patent Application No. 2,916,019.

Australian Examination Report dated Aug. 3, 2018, for Australian Patent Application No. 2017204825.

Mexico Office Action dated Mar. 6, 2019, for Mexico Patent Application No. MX/a/2015/017767.

EPO Office Action dated Mar. 20, 2019, for European Patent Application No. 14742079.8.

Canadian Office Action in related application CA2990911 dated Oct. 7, 2020.

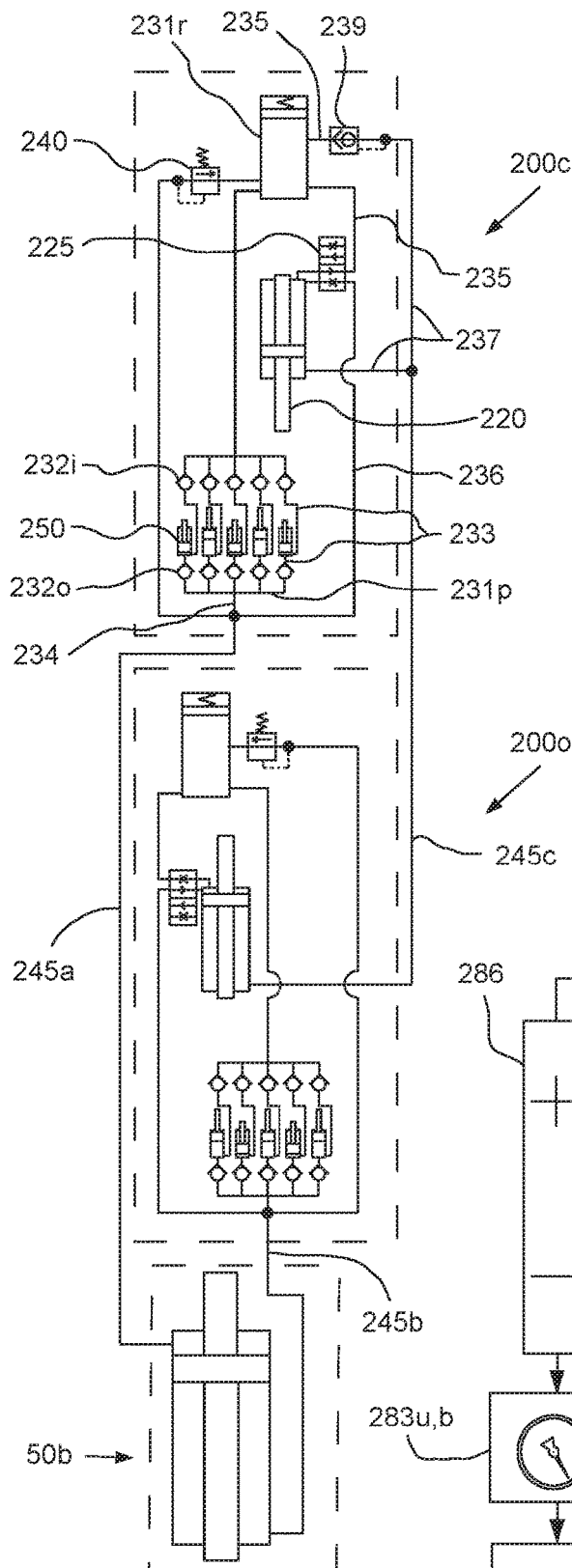
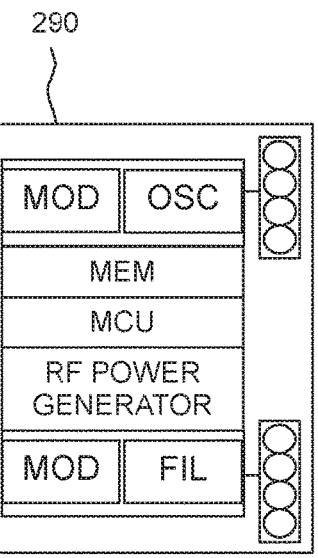
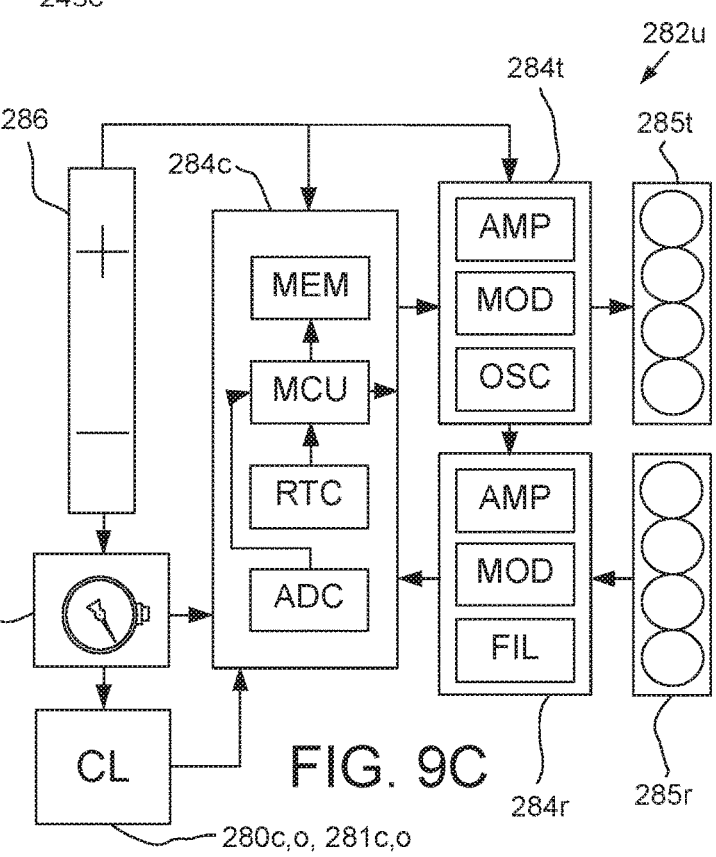
FIG. 8D
FIG. 9D
FIG. 9C

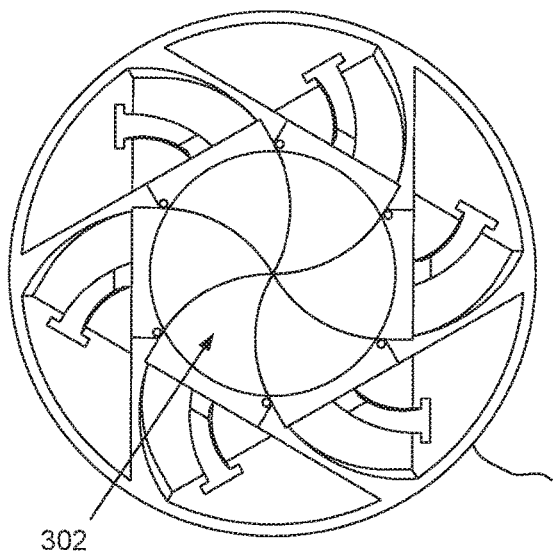
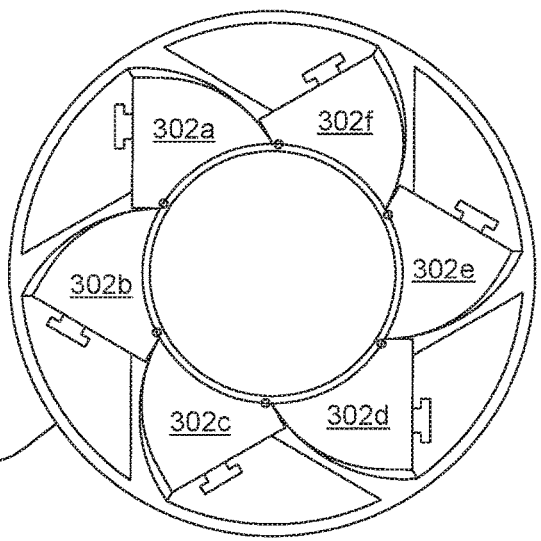
FIG. 10A  FIG. 10B
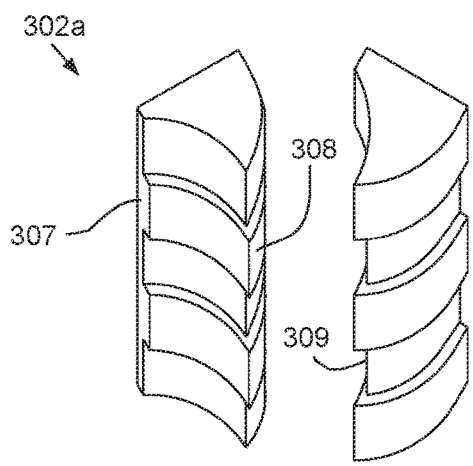
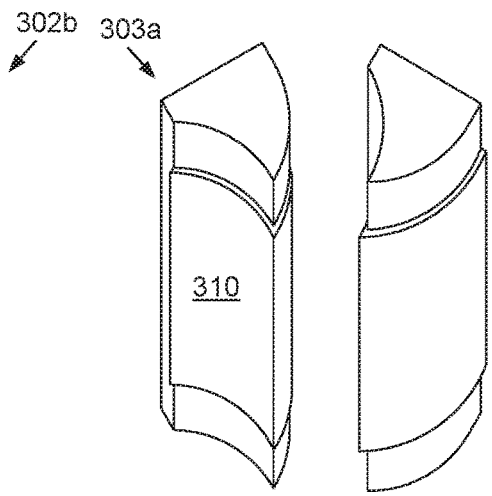
FIG. 10C  FIG. 10D
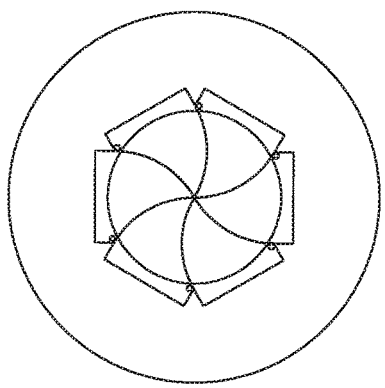
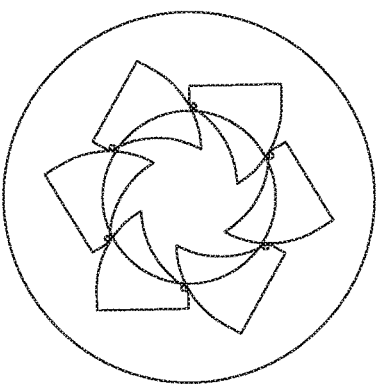
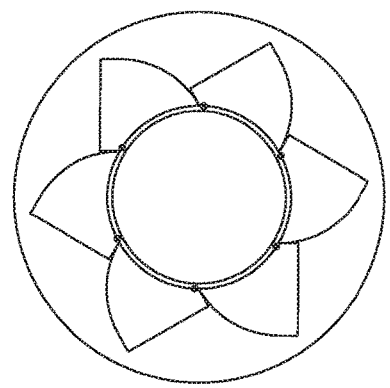
FIG. 10E  FIG. 10F  FIG. 10G

BIDIRECTIONAL DOWNHOLE ISOLATION VALVE

CROSS-REFERENCE TO RELATED APPLICATIONS

This application is a continuation of U.S. patent application Ser. No. 15/645,778, filed Jul. 10, 2017; which is a continuation of U.S. patent application Ser. No. 14/313,089, filed Jun. 24, 2014; and which claims benefit of U.S. Provisional Patent Application Ser. No. 61/839,447, filed Jun. 26, 2013. Each of the above referenced applications is incorporated herein by reference.

BACKGROUND OF THE DISCLOSURE

Field of the Disclosure

The present disclosure generally relates to a bidirectional downhole isolation valve.

Description of the Related Art

A hydrocarbon bearing formation (i.e., crude oil and/or natural gas) is accessed by drilling a wellbore from a surface of the earth to the formation. After the wellbore is drilled to a certain depth, steel casing or liner is typically inserted into the wellbore and an annulus between the casing/liner and the earth is filled with cement. The casing/liner strengthens the borehole, and the cement helps to isolate areas of the wellbore during further drilling and hydrocarbon production.

Once the wellbore has reached the formation, the formation is then usually drilled in an overbalanced condition meaning that the annulus pressure exerted by the returns (drilling fluid and cuttings) is greater than a pore pressure of the formation. Disadvantages of operating in the overbalanced condition include expense of the weighted drilling fluid and damage to formations by entry of the mud into the formation. Therefore, underbalanced or managed pressure drilling may be employed to avoid or at least mitigate problems of overbalanced drilling. In underbalanced and managed pressure drilling, a lighter drilling fluid is used so as to prevent or at least reduce the drilling fluid from entering and damaging the formation. Since underbalanced and managed pressure drilling are more susceptible to kicks (formation fluid entering the annulus), underbalanced and managed pressure wellbores are drilled using a rotating control device (RCD) (aka rotating diverter, rotating BOP, or rotating drilling head). The RCD permits the drill string to be rotated and lowered therethrough while retaining a pressure seal around the drill string.

An isolation valve as part of the casing/liner may be used to temporarily isolate a formation pressure below the isolation valve such that a drill or work string may be quickly and safely inserted into a portion of the wellbore above the isolation valve that is temporarily relieved to atmospheric pressure. The isolation valve allows a drill/work string to be tripped into and out of the wellbore at a faster rate than snubbing the string in under pressure. Since the pressure above the isolation valve is relieved, the drill/work string can trip into the wellbore without wellbore pressure acting to push the string out. Further, the isolation valve permits insertion of the drill/work string into the wellbore that is incompatible with the snubber due to the shape, diameter and/or length of the string.

Typical isolation valves are unidirectional, thereby sealing against formation pressure below the valve but not remaining closed should pressure above the isolation valve exceed the pressure below the valve. This unidirectional nature of the valve may complicate insertion of the drill or work string into the wellbore due to pressure surge created during the insertion. The pressure surge may momentarily open the valve allowing an influx of formation fluid to leak through the valve.

SUMMARY OF THE DISCLOSURE

The present disclosure generally relates to a bidirectional downhole isolation valve. In one embodiment, an isolation valve for use in a wellbore includes: a tubular housing; an upper flapper disposed in the housing and pivotable relative thereto between an open position and a closed position; an upper piston operable to open or close the upper flapper; a lower flapper disposed in the housing and pivotable relative thereto between an open position and a closed position; a lower piston operable to open the lower flapper; an opener passage in fluid communication with the pistons and an opener hydraulic coupling; and a closer passage in fluid communication with the pistons and a closer hydraulic coupling.

In another embodiment, a method of drilling a wellbore includes: deploying a drill string into the wellbore through a casing string disposed in the wellbore, the casing string having an isolation valve; drilling the wellbore into a formation by injecting drilling fluid through the drill string and rotating a drill bit of the drill sting; retrieving the drill string from the wellbore until the drill bit is above one or more valve members of the isolation valve; and closing the valve members, thereby bidirectionally isolating the formation from an upper portion of the wellbore.

In another embodiment, an isolation valve for use in a wellbore includes: a tubular housing; a first flapper disposed in the housing and pivotable relative thereto between an open position and a closed position; a first seat for receiving the first flapper in the closed position; a first piston operable to open the first flapper; a second flapper disposed in the housing and pivotable relative thereto between an open position and a closed position; a second seat for receiving the second flapper in the closed position; and a second piston operable to open the second flapper. A closing chamber is formed between the first piston and the housing. A passage is formed between the first piston and first seat. The passage is in fluid communication with the closing chamber and a bore of the isolation valve.

In another embodiment, an isolation valve for use in a wellbore includes: a tubular housing; a plurality of wedges disposed in the housing and pivotable relative thereto between an open position and a closed position; a cam having a plurality of rods, each rod linked to a respective wedge; and a piston operable to longitudinally move the cam relative to the wedges.

In another embodiment, an isolation valve for use in a wellbore includes: a tubular housing; a track formed in an inner surface of the housing; a valve member having a plurality of sections pivotally connected to each other; and a piston operable to push the sections into engagement with and along the track.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 8A-8D illustrate an offshore drilling system in a tripping mode, according to another embodiment of the present disclosure.

FIG. 9C illustrates an upper sensor sub of the isolation valve. FIG. 9D illustrates a radio frequency identification (RFID) tag for communication with the sensor sub.

FIGS. 10A-10K illustrate an alternative isolation valve, according to another embodiment of the present disclosure.

DETAILED DESCRIPTION

Figure 1A:
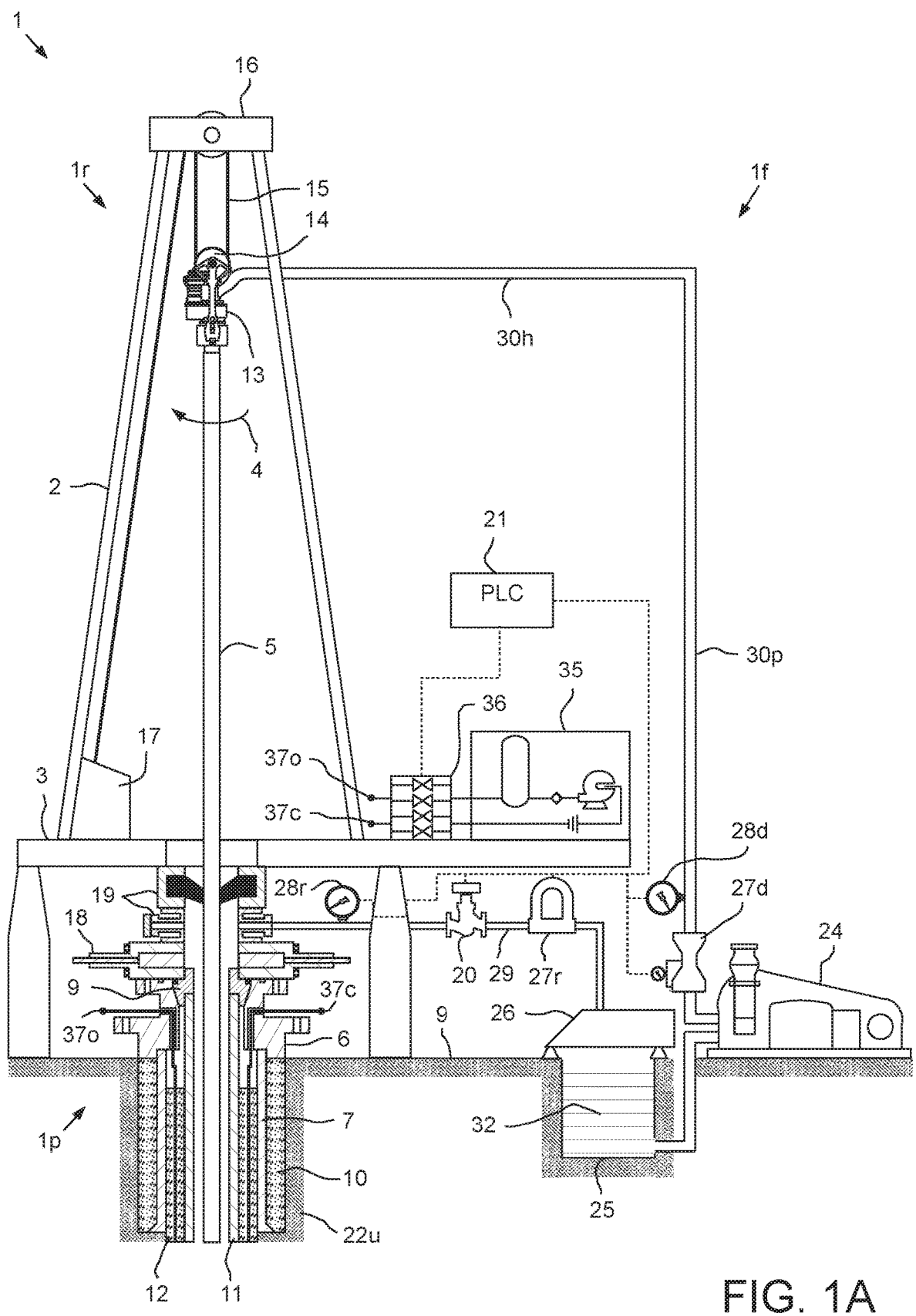
FIGS. 1A and 1B illustrate a terrestrial drilling system in a drilling mode, according to one embodiment of the present disclosure.
Figure 1B:
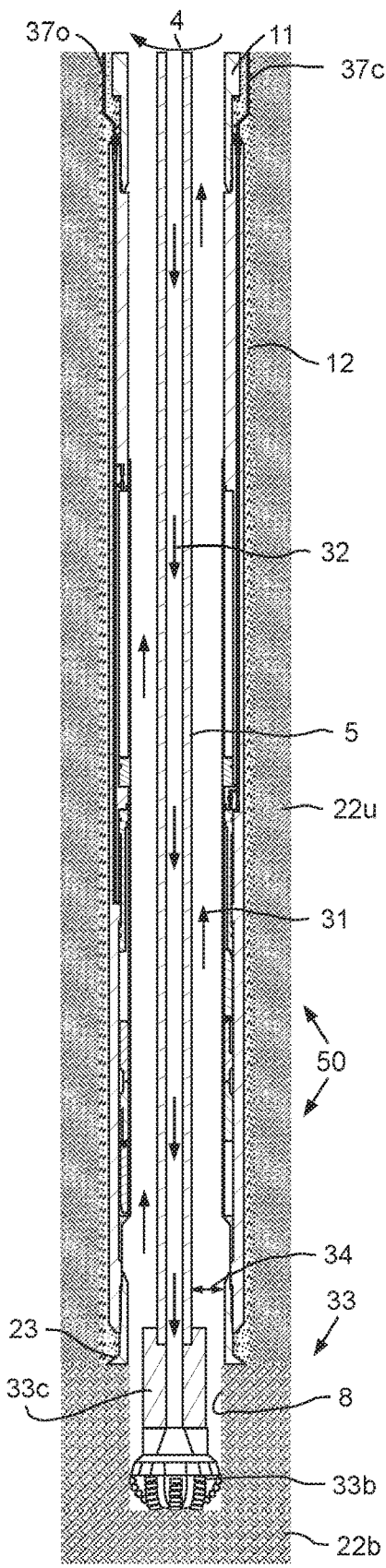
Figure 8A:
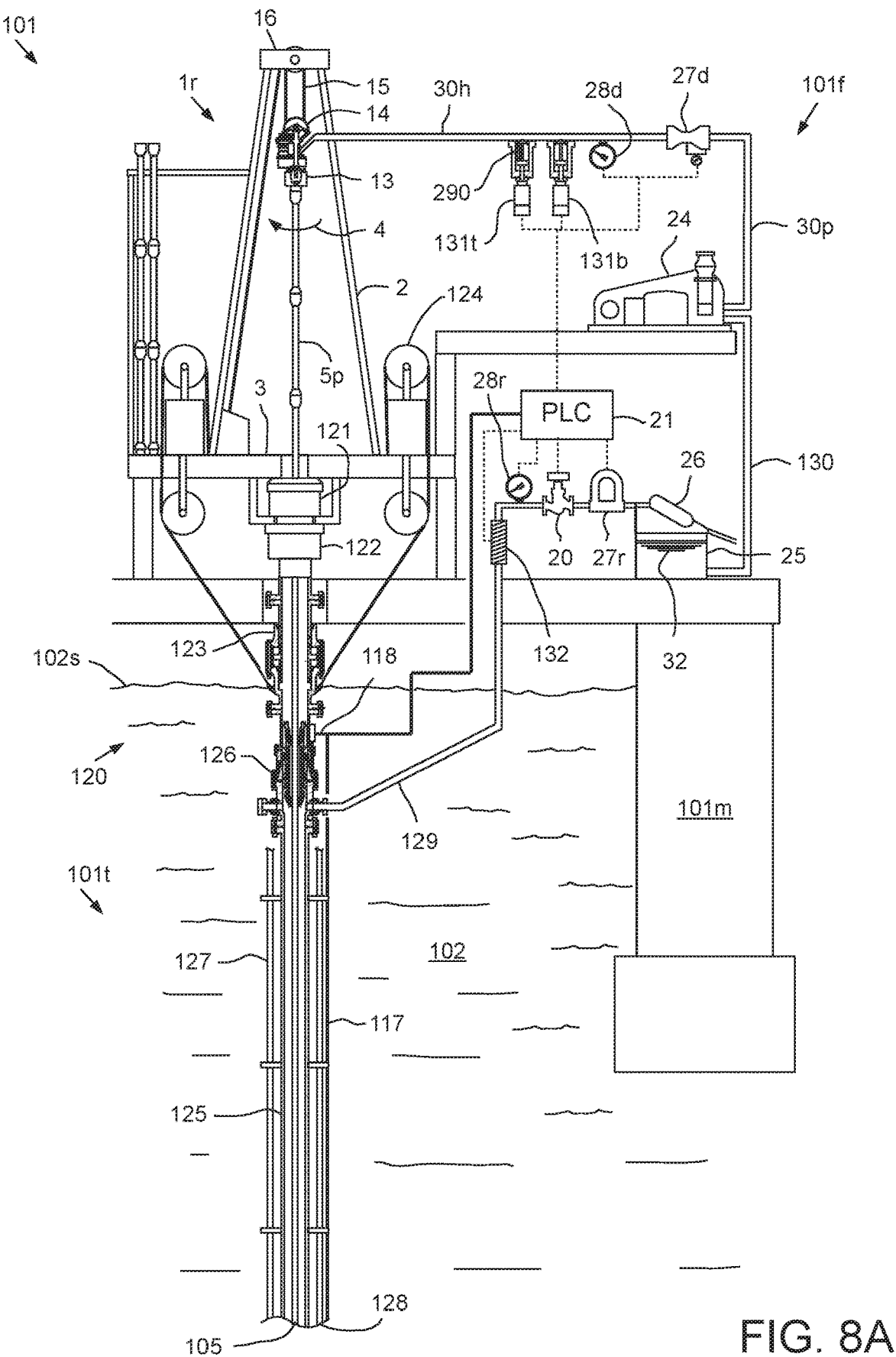
Figure 8B:
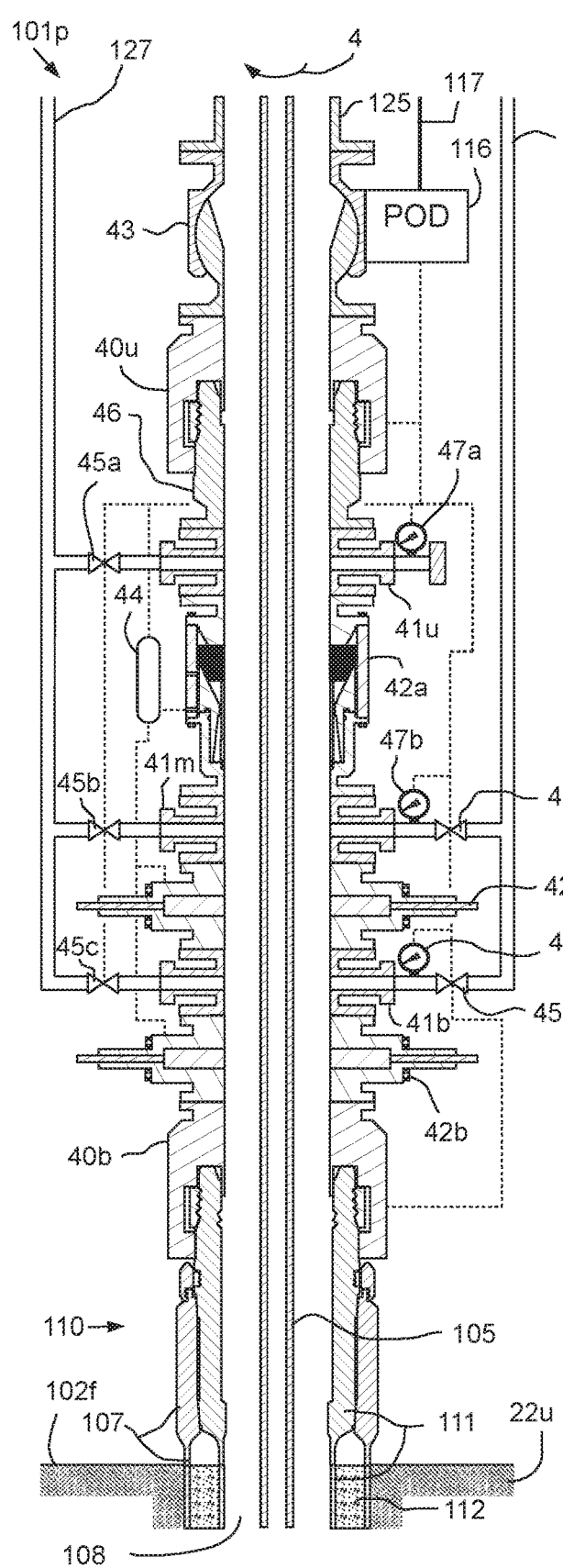

FIGS. 1A and 1B illustrate a terrestrial drilling system 1 in a drilling mode, according to one embodiment of the present disclosure. The drilling system 1 may include a drilling rig 1r, a fluid handling system 1f, a pressure control assembly (PCA) 1p, and a drill string 5. The drilling rig 1r may include a derrick 2 having a rig floor 3 at its lower end. The rig floor 3 may have an opening through which the drill string 5 extends downwardly into the PCA 1p. The drill string 5 may include a bottomhole assembly (BHA) 33 and a conveyor string 5p. The conveyor string 5p may include joints of drill pipe (FIG. 8A) connected together, such as by threaded couplings. The BHA 33 may be connected to the conveyor string 5p, such as by threaded couplings, and include a drill bit 33b and one or more drill collars 33c connected thereto, such as by threaded couplings. The drill bit 33b may be rotated 4 by a top drive 13 via the conveyor string 5p and/or the BHA 33 may further include a drilling motor (not shown) for rotating the drill bit. The BHA 33 may further include an instrumentation sub (not shown), such as a measurement while drilling (MWD) and/or a logging while drilling (LWD) sub.

An upper end of the drill string 5 may be connected to a quill of the top drive 13. The top drive 13 may include a motor for rotating 4 the drill string 5. The top drive motor may be electric or hydraulic. A frame of the top drive 13 may be coupled to a rail (not shown) of the derrick 2 for preventing rotation thereof during rotation of the drill string 5 and allowing for vertical movement of the top drive with a traveling block 14. The frame of the top drive 13 may be suspended from the derrick 2 by the traveling block 14. The traveling block 14 may be supported by wire rope 15 connected at its upper end to a crown block 16. The wire rope 15 may be woven through sheaves of the blocks 14, 16 and extend to drawworks 17 for reeling thereof, thereby raising or lowering the traveling block 14 relative to the derrick 2.

A wellhead 6 may be mounted on an outer casing string 7 which has been deployed into a wellbore 8 drilled from a surface 9 of the earth and cemented 10 into the wellbore. An inner casing string 11 has been deployed into the wellbore 8, hung 9 from the wellhead 6, and cemented 12 into place. The PCA 1p may be connected to a wellhead 6. The PCA 1p may include a blow out preventer (BOP) 18, a rotating control device (RCD) 19, a variable choke valve 20, a hydraulic power unit (HPU) 35, a hydraulic manifold 36, one or more control lines 37o,c, and an isolation valve 50. A housing of the BOP 18 may be connected to the wellhead 6, such as by a flanged connection. The BOP housing may also be connected to a housing of the RCD 19, such as by a flanged connection.

The RCD 19 may include a stripper seal and the housing. The stripper seal may be supported for rotation relative to the housing by bearings. The stripper seal-housing interface may be isolated by seals. The stripper seal may form an interference fit with an outer surface of the drill string 5 and be directional for augmentation by wellbore pressure. The choke 20 may be connected to an outlet of the RCD 19. The choke 20 may include a hydraulic actuator operated by a programmable logic controller (PLC) 21 via a second hydraulic power unit (HPU) (not shown) to maintain backpressure in the wellhead 6.

The inner casing string 11 may extend to a depth adjacent a bottom of an upper formation 22u. The upper formation 22u may be non-productive and a lower formation 22b may be a hydrocarbon-bearing reservoir. Alternatively, the lower formation 22b may be non-productive (e.g., a depleted zone), environmentally sensitive, such as an aquifer, or unstable. The inner casing string 11 may include a casing hanger 9, a plurality of casing joints connected together, such as by threaded connections, the isolation valve 50, and a guide shoe 23.

Alternatively, the wellbore may be subsea having a wellhead located adjacent to the waterline and the drilling rig may be a located on a platform adjacent the wellhead. Alternatively, a Kelly and rotary table (not shown) may be used instead of the top drive. Alternatively, the choke actuator may be electrical or pneumatic.

The fluid system 1f may include a mud pump 24, a drilling fluid reservoir, such as a pit 25 or tank, a degassing spool (not shown), a solids separator, such as a shale shaker 26, one or more flow meters 27d,r, one or more pressure sensors 28d,r, a return line 29, a feed line, and a supply line 30h,p. A first end of the return line 29 may be connected to the RCD outlet and a second end of the return line may be connected to an inlet of the shaker 26. The returns pressure sensor 28r, choke 20, and returns flow meter 27r may be assembled as part of the return line 29. A lower end of the supply line 30p,h may be connected to an outlet of the mud pump 24 and an upper end of the supply line may be connected to an inlet of the top drive 13. The supply pressure sensor 28d and supply flow meter 27d may be assembled as part of the supply line 30p,h. A lower end of the feed line may be connected to an outlet of the pit 25 and an upper end of the feed line may be connected to an inlet of the mud pump 24.

Each pressure sensor 28d,r may be in data communication with the PLC 21. The returns pressure sensor 28r may be connected between the choke 20 and the RCD outlet port and may be operable to monitor wellhead pressure. The supply pressure sensor 28d may be connected between the mud pump 24 and a Kelly hose 30h of the supply line 30p,h and may be operable to monitor standpipe pressure. The returns 27r flow meter may be a mass flow meter, such as a Coriolis flow meter, and may each be in data communication with the PLC 21. The returns flow meter 27r may be connected between the choke 20 and the shale shaker 26 and may be operable to monitor a flow rate of drilling returns 31. The supply 27d flow meter may be a volumetric flow meter, such as a Venturi flow meter, and may be in data communication with the PLC 21. The supply flow meter 27d may be connected between the mud pump 24 and the Kelly hose 30h and may be operable to monitor a flow rate of the mud pump. The PLC 21 may receive a density measurement of drilling fluid 32 from a mud blender (not shown) to determine a mass flow rate of the drilling fluid from the volumetric measurement of the supply flow meter 27d.

Alternatively, a stroke counter (not shown) may be used to monitor a flow rate of the mud pump instead of the supply flow meter. Alternatively, the supply flow meter may be a mass flow meter.

To extend the wellbore 8 from the casing shoe 23 into the lower formation 22b, the mud pump 24 may pump the drilling fluid 32 from the pit 25, through standpipe 30p and Kelly hose 30h to the top drive 13. The drilling fluid 32 may include a base liquid. The base liquid may be refined or synthetic oil, water, brine, or a water/oil emulsion. The drilling fluid 32 may further include solids dissolved or suspended in the base liquid, such as organophilic clay, lignite, and/or asphalt, thereby forming a mud.

Alternatively, the drilling fluid 32 may further include a gas, such as diatomic nitrogen mixed with the base liquid, thereby forming a two-phase mixture. Alternatively, the drilling fluid may be a gas, such as nitrogen, or gaseous, such as a mist or foam. If the drilling fluid 32 includes gas, the drilling system 1 may further include a nitrogen production unit (not shown) operable to produce commercially pure nitrogen from air.

The drilling fluid 32 may flow from the supply line 30p,h and into the drill string 5 via the top drive 13. The drilling fluid 32 may be pumped down through the drill string 5 and exit a drill bit 33b, where the fluid may circulate the cuttings away from the bit and return the cuttings up an annulus 34 formed between an inner surface of the inner casing 11 or wellbore 8 and an outer surface of the drill string 10. The returns 31 (drilling fluid plus cuttings) may flow up the annulus 34 to the wellhead 6 and be diverted by the RCD 19 into the RCD outlet. The returns 31 may continue through the choke 20 and the flow meter 27r. The returns 31 may then flow into the shale shaker 26 and be processed thereby to remove the cuttings, thereby completing a cycle. As the drilling fluid 32 and returns 31 circulate, the drill string 5 may be rotated 4 by the top drive 13 and lowered by the traveling block 14, thereby extending the wellbore 8 into the lower formation 22b.

A static density of the drilling fluid 32 may correspond to a pore pressure gradient of the lower formation 22b and the PLC 21 may operate the choke 20 such that an underbalanced, balanced, or slightly overbalanced condition is maintained during drilling of the lower formation 22b. During the drilling operation, the PLC 21 may also perform a mass balance to ensure control of the lower formation 22b. As the drilling fluid 32 is being pumped into the wellbore 8 by the mud pump 24 and the returns 31 are being received from the return line 29, the PLC 21 may compare the mass flow rates (i.e., drilling fluid flow rate minus returns flow rate) using the respective flow meters 27d,r. The PLC 21 may use the mass balance to monitor for formation fluid (not shown) entering the annulus 34 (some ingress may be tolerated for underbalanced drilling) and contaminating the returns 31 or returns entering the formation 22b.

Upon detection of a kick or lost circulation, the PLC 21 may take remedial action, such as diverting the flow of returns 31 from an outlet of the returns flow meter 27r to the degassing spool. The degassing spool may include automated shutoff valves at each end, a mud-gas separator (MGS), and a gas detector. A first end of the degassing spool may be connected to the return line 29 between the returns flow meter 27r and the shaker 26 and a second end of the degasser spool may be connected to an inlet of the shaker. The gas detector may include a probe having a membrane for sampling gas from the returns 31r, a gas chromatograph, and a carrier system for delivering the gas sample to the chromatograph. The MGS may include an inlet and a liquid outlet assembled as part of the degassing spool and a gas outlet connected to a flare or a gas storage vessel. The PLC 21 may also adjust the choke 20 accordingly, such as tightening the choke in response to a kick and loosening the choke in response to loss of the returns.

Figure 2C:
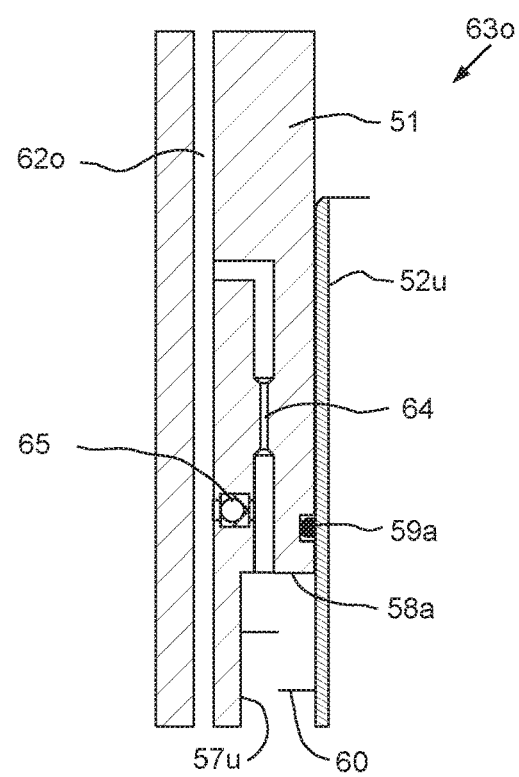
FIGS. 2C and 2D illustrate detents of the isolation valve.
Figure 2D:
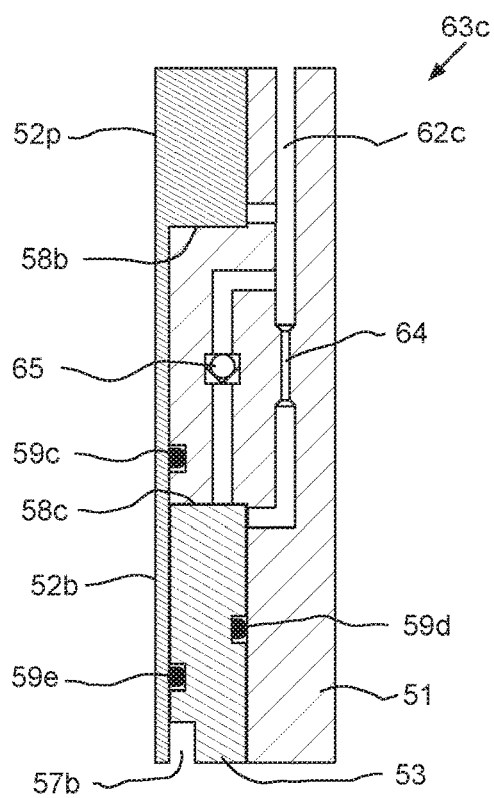
Figure 2A:
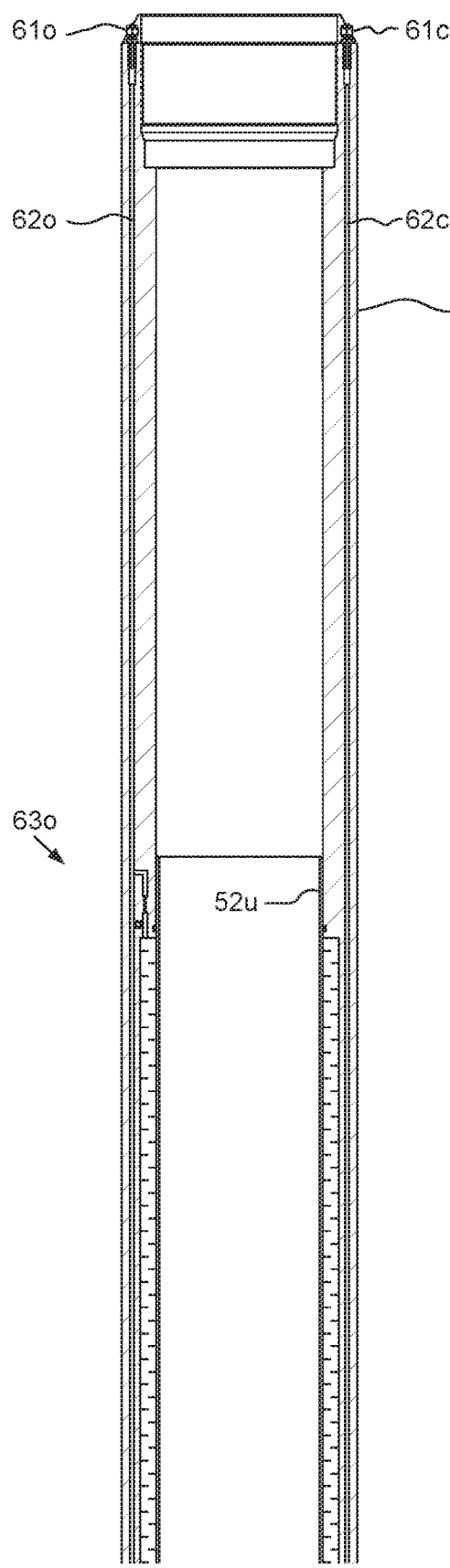
FIGS. 2A and 2B illustrate an isolation valve of the drilling system in an open position.
Figure 2B:
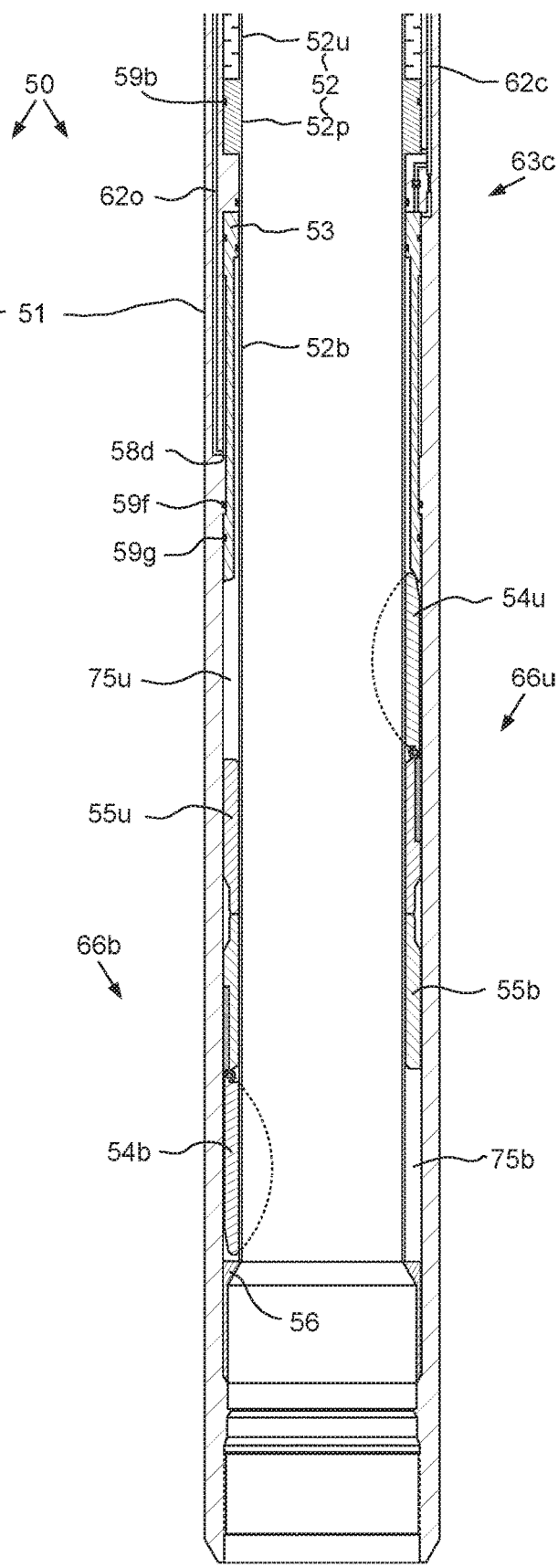

FIGS. 2A and 2B illustrate the isolation valve 50 in an open position. FIGS. 2C and 2D illustrate detents of the isolation valve 50. The isolation valve 50 may include a tubular housing 51, one or more openers, such as flow tube 52 and a lower piston 53, one or more closure members, such as an upper flapper 54u and a lower flapper 54b, one or more seats, such as upper seat 55u and lower seat 55b, and a receiver 56. To facilitate manufacturing and assembly, the housing 51 may include one or more sections (only one section shown) each connected together, such by threaded couplings and/or fasteners. Interfaces between the housing sections may be isolated, such as by seals. The housing sections may include an upper adapter (not shown) and a lower adapter (not shown), each having a threaded coupling, such as a pin or box, for connection to other members of the inner casing string 11. The valve 50 may have a longitudinal bore therethrough for passage of the drill string 5. Each seat 55u,b may be connected to the housing 51, such as by threaded couplings and/or fasteners. The receiver 56 may be connected to the housing 51, such as by threaded couplings and/or fasteners.

Figures 3A, 3B, 3C, 3D:
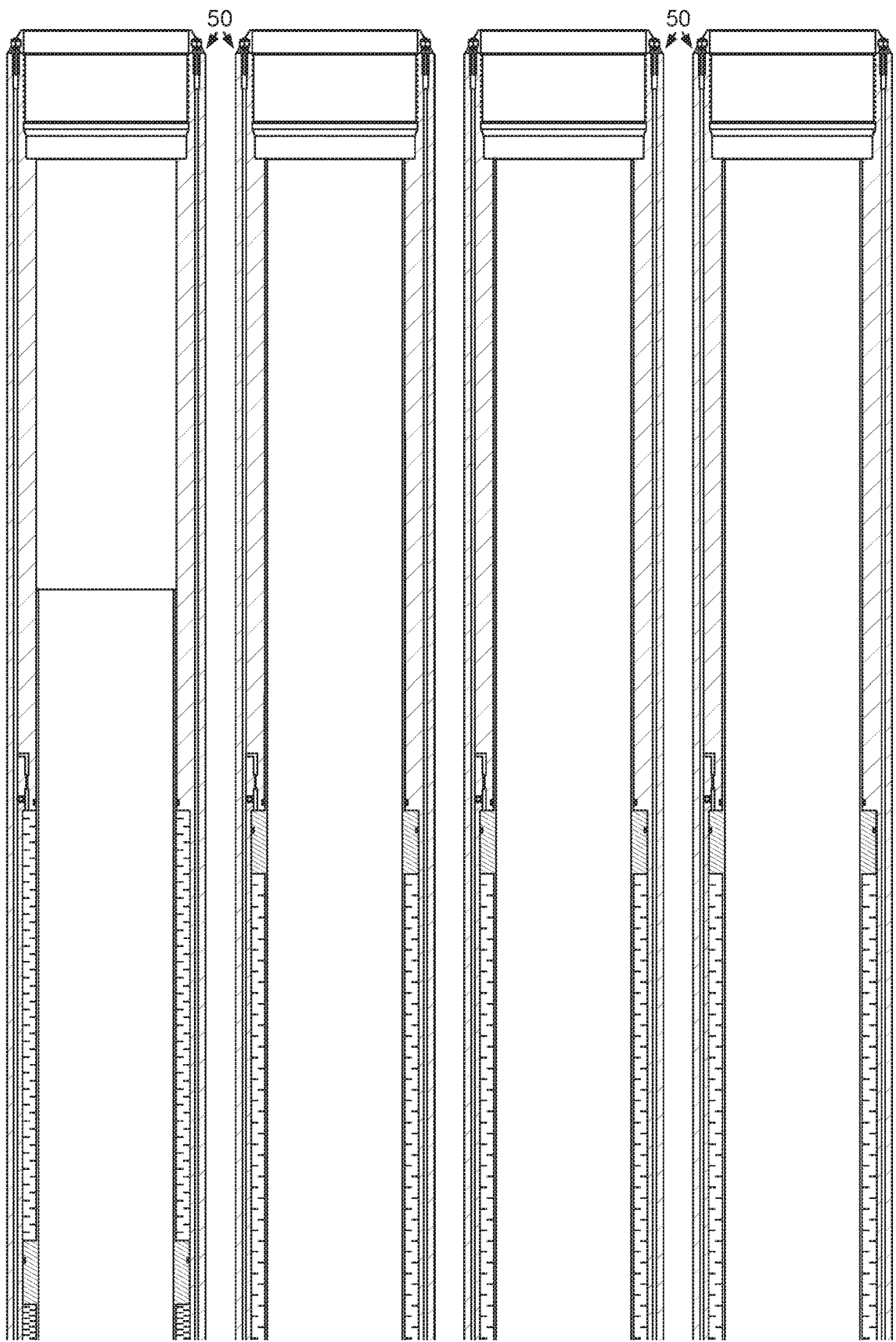
FIGS. 3A-3D illustrate closing of an upper portion of the isolation valve.
Figures 4A, 4B, 4C, 4D:
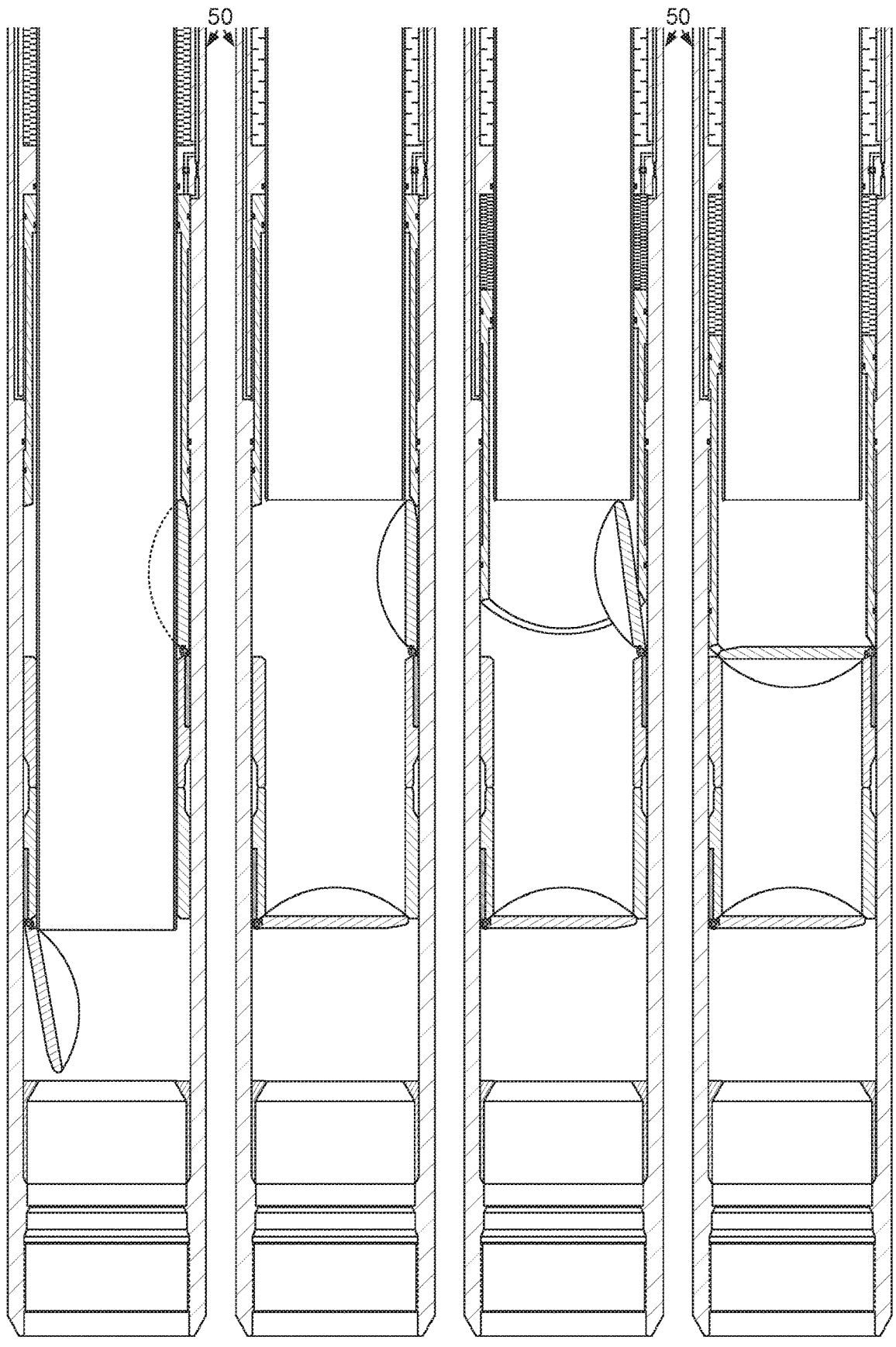
FIGS. 4A-4D illustrate closing of a lower portion of the isolation valve.

The flow tube 52 may be disposed within the housing 51 and be longitudinally movable relative thereto between a lower position (shown) and an upper position (FIGS. 3B and 4B). The flow tube 52 may have one or more portions, such as an upper sleeve 52u, a lower sleeve 52b, and an upper piston 52p (relative to lower piston 53) connecting the upper and lower sleeves. The upper piston 52p may carry a seal 59b for sealing an interface formed between an outer surface thereof and an inner surface of the housing 51. The lower piston 53 may be disposed between the housing 51 and the flow tube 52 and be longitudinally movable relative thereto between an upper position (shown) and a lower position (FIG. 4D). An upper portion of the lower piston 53 may carry an inner seal 59e for sealing an interface formed between an inner surface thereof and an outer surface of the flow tube lower sleeve 52b and an outer seal 59d for sealing an interface formed between an outer surface thereof and an inner surface of the housing 51. A lower portion of the lower piston 53 may carry a wiper 59g for engaging an inner surface of the housing 51 defining an upper flapper chamber 75u.

Alternatively, the upper piston may be a separate member connected to the flow tube, such as by threaded couplings and/or fasteners.

Upper 57u and lower 57b hydraulic chambers may be formed in an inner surface of the housing 51. The housing 51 may have shoulders 58a-d formed in an inner surface thereof. The housing 51 may carry an upper seal 59a located adjacent to the first shoulder 58a, a mid seal 59c located between the second and third shoulders 58b,c, and a lower seal 59f located adjacent to the fourth shoulder 58d for isolating the chambers 57u,b from the bore of the isolation valve 50. The upper hydraulic chamber 57u may be defined radially between the flow tube 52 and the body 51 and longitudinally between the first and second shoulders 58a,b. The lower hydraulic chamber 57b may be defined radially between the flow tube 52 and the body 51 and longitudinally between the third and fourth shoulders 58c,d. Hydraulic fluid 60 may be disposed in the chambers 57u,b.

A lower end of the upper chamber 57u and an upper end of the lower chamber 57b may be in fluid communication with a closer hydraulic coupling 61c via a closer hydraulic passage 62c formed through a wall of the body 51. An upper end of the upper chamber 57u and a lower end of the lower chamber 57b may be in fluid communication with an opener hydraulic coupling 61o via an opener hydraulic passage 62o formed through a wall of the body 51. Lower ends of the chambers 57u,b may be located above the flappers 54u,b such that the hydraulic passages 62o,c do not have to extend into a lower portion of the housing (beginning at just below seal 59f) having a wall thinned by inclusion of flapper chambers 75u,b and the seats 55u,b.

The fluid communication between the upper end of the lower chamber 57b and the closer passage 62c may be provided by a closer detent 63c. The fluid communication between the upper end of the upper chamber 57u and the opener passage 62o may be provided by an opener detent 63o. Each detent 63c,o may include a choke passage and a bypass passage. The choke passage may have a flow restrictor formed therein, such as an orifice 64, and the bypass passage may have a valve, such as check valve 65, disposed therein. The check valve 65 may be oriented to allow hydraulic fluid flow from the respective chamber 52u,b to the respective passage 62o,c, thereby bypassing the orifice 64, and to prevent reverse hydraulic fluid flow from the respective passage 62o,c to the respective chamber 52u,b, thereby forcing the hydraulic fluid 60 through the orifice 64.

Alternatively, the flow restrictor may be a nozzle or Venturi. Alternatively, each detent may include a pressure relief valve or pressure regulator instead of a flow restrictor. Alternatively, each detent may be mechanical instead of hydraulic, such as a collet, formed in the respective flow tube and piston and mating profiles formed in the housing.

Figure 2E:
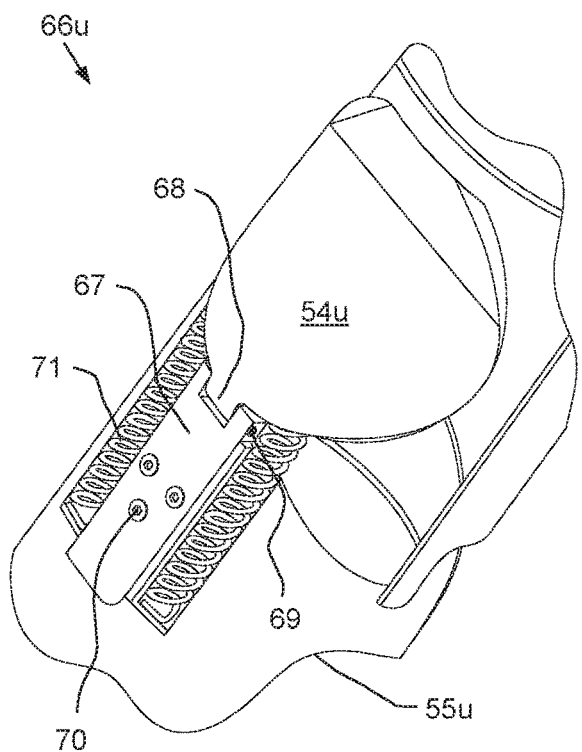
FIGS. 2E and 2F illustrate hinges of the isolation valve.
Figure 2G:
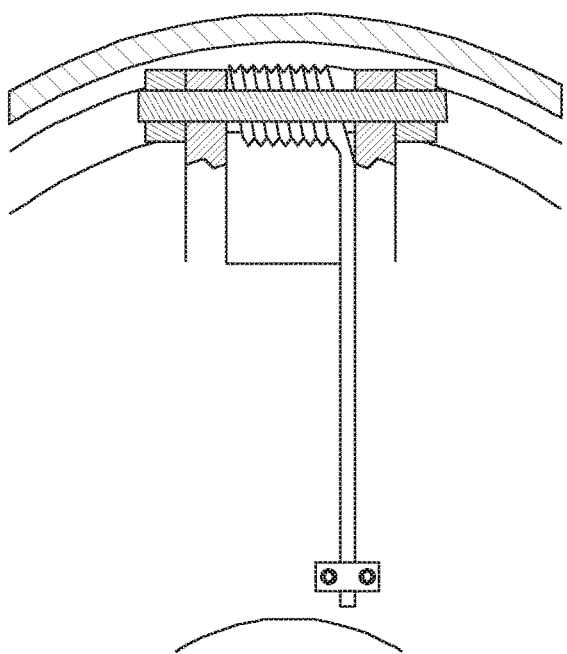
FIG. 2G illustrates an alternative hinge for use with the isolation valve, according to another embodiment of the present disclosure.
Figure 2F:
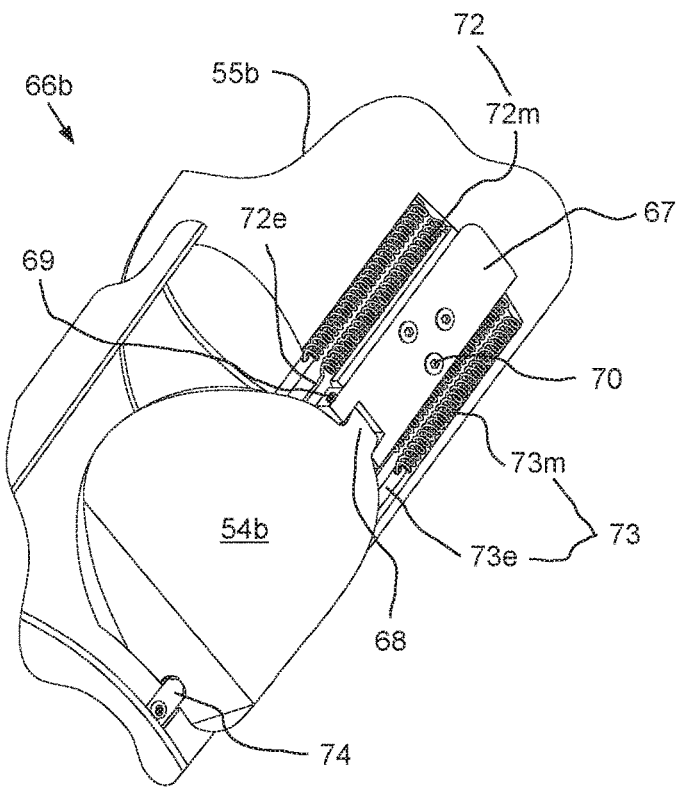

FIGS. 2E and 2F illustrate hinges 66u,b of the isolation valve 50. The isolation valve 50 may further include upper 66u and lower 66b hinges. Each flapper 54u,b may be pivotally connected to the respective seat 55u,b by the respective hinge 66u,b. Each flapper 54u,b may pivot about the respective hinge 66u,b between an open position (shown) and a closed position (FIG. 4D). The upper flapper 54u may be positioned above the upper seat 55u such that the upper flapper may open upwardly and the lower flapper 54b may be positioned below the lower seat 55b such that the lower flapper may open downwardly. Each flapper 54u,b may have an undercut formed in at least a portion of an outer face thereof. The upper flapper undercut may facilitate engagement of an outer surface of the upper flapper 54u with a cam profile formed in a lower end of the lower piston 53. The lower flapper undercut may facilitate engagement of an outer surface of the lower flapper 54b with a kickoff spring 74 connected to the housing 51, such as by a fastener. An inner periphery of each flapper 54u,b may engage a respective seating profile formed in an adjacent end of the respective seat 55u,b in the closed position, thereby isolating an upper portion of the valve bore from a lower portion of the valve bore. The interface between each flapper 54u,b and the respective seat 55u,b may be a metal to metal seal.

Each hinge 66u,b may include a leaf 67, a knuckle 68 of the respective flapper 54u,b, one or more flapper springs, and a fastener, such as hinge pin 69, extending through holes of the respective flapper knuckle 68 and a hole of each of one or more (two shown) knuckles of the leaf 67. Each seat 55u,b may have a recess formed in an outer surface thereof at an end adjacent to the respective flapper for receiving the respective leaf 67. Each leaf 67 may be connected to the respective seat, such as by one or more (three shown) fasteners 70.

The upper flapper 54u may be biased toward the open position by the flapper springs, such as one or more (pair shown) compression springs 71. The lower flapper 54b may be biased toward the closed position by the flapper springs, such as one or more (pair of each shown) inner 72 and outer 73 tension springs. Each tension spring 72, 73 may include a respective main portion 72m, 73m and an extension 72e, 73e. Each seat 55u,b may have slots formed therethrough for receiving the respective flapper springs 71-73. An upper end of the main portions 72m, 73m may be connected to the lower seat 55b at an end of the slots. Each seat 55u,b may also have a guide path formed in an outer surface thereof for passage of the respective springs 71-73 to the respective flapper 54u,b. Ends of the extensions 72e, 73e may be connected to an inner face of the lower flapper 54b. The kickoff spring 74 may assist the tension springs 72, 73 in closing the lower flapper 54b due to the reduced lever arm of the spring tension when the lower flapper is in the open position.

FIG. 2G illustrates an alternative hinge for use with the isolation valve 50, according to another embodiment of the present disclosure. The alternative hinge may be used to connect the upper flapper to the upper seat instead of the upper hinge. The alternative hinge may include one or more knuckles formed at a lower end of the upper flapper, one or more knuckles formed at a lower end of the upper seat, a fastener, such as hinge pin, extending through holes of the knuckles, and a flapper spring, such as a torsion spring. The upper flapper may pivot about the alternative hinge between an open position (not shown) and a closed position (shown). The torsion spring may be wrapped around the hinge pin and have ends in engagement with the flapper and the upper seat so as to bias the flapper toward the open position. The flapper end of the torsion spring may be connected to the flapper, such as by a fastened bracket.

Alternatively, the upper hinge 66u may include tension springs instead of compression springs by moving the hinge pin radially inward or connecting the tension springs to an outer surface of the upper flapper. Alternatively, each leaf of the hinges may be free to slide relative to the respective seat by a limited amount and a polymer seal ring may be disposed in a groove formed in the seating profile of each seat such that the interface between the flapper inner periphery and the seating profile is a hybrid polymer and metal to metal seal. Alternatively, the seal ring may be disposed in the flapper inner periphery.

The upper flapper 54u may be opened and closed by interaction with the lower piston 53 and the lower flapper 54b may be opened and closed by interaction with the flow tube 52. Downward movement of the lower piston 53 relative to the upper flapper 54u may push and pivot the upper flapper to the closed position against the compression springs 71 due to sliding of the lower piston cam surface along an outer surface of the upper flapper toward the upper hinge 66u. Upper movement of the lower piston 53 relative to the upper flapper 54u may allow the compression springs 71 to push and pivot the upper flapper to the open position due to sliding of the lower piston cam surface along the outer surface of the upper flapper away from the upper hinge 66u.

Downward movement of the flow tube 52 may engage the lower sleeve 52b thereof with the lower flapper 54b, thereby pushing and pivoting the lower flapper to the open position against the tension springs 72, 73 due to engagement of a bottom of the lower sleeve with an inner surface of the lower flapper. Upward movement of the flow tube 52 may disengage the lower sleeve 52b thereof with the lower flapper 54b, thereby allowing the tension springs 72, 73 to pull and pivot the lower flapper to the closed position due to disengagement of the lower sleeve bottom from the inner surface of the lower flapper.

Each flapper 54u,b may act as a check valve in the closed position. The upper flapper 54u may be pressed against the upper seat 55u in response to fluid pressure in the valve bore upper portion being greater than fluid pressure in the valve bore lower portion and lower flapper 54b may be pressed against the lower seat 55b in response to fluid pressure in the valve bore lower portion being greater than fluid pressure in the valve bore upper portion. Closure of the dual flappers 54u,b may impart bidirectional capability to the isolation valve 50. The upper flapper 54u may also serve to protect the lower flapper 54b from dropped objects.

When the flow tube 52 is in the lower position, an upper flapper chamber 75u and a lower flapper chamber 75b may each be formed radially between the housing 51 and the flow tube and each (open) flapper 54u,b may be stowed in the respective flapper chamber. The upper flapper chamber 75u may be formed longitudinally between the upper seat 55u and the lower piston 54 and the lower flapper chamber 75b may be formed longitudinally between the lower seat 55b and the receiver 56. The flow tube bottom may be positioned adjacent to an upper end of the receiver 56, thereby closing the lower flapper chamber 75b. The flapper chambers 75u,b may protect the flappers 54u,b from abrasion by the drill string 5 and from being eroded and/or fouled by cuttings in the drilling returns 31. Each flapper 54u,b may have a curved shape to conform to the annular shape of the respective flapper chamber 75u,b and the seating profiles of the flapper seats 55u,b may have curved shapes (FIG. 4C) complementary to the flapper curvatures.

FIGS. 3A-3D illustrate closing of an upper portion of the isolation valve 50. FIGS. 4A-4D illustrate closing of a lower portion of the isolation valve 50. After drilling of the lower formation 22b to total depth, the drill string 5 may be raised to such that the drill bit 33b is above the flappers 54u,b. The PLC 21 may then operate the hydraulic manifold 36 to supply pressurized hydraulic fluid 60 from an accumulator of the HPU 35 to the closer passage 62c and to relieve hydraulic fluid from the opener passage 62o to a reservoir of the HPU. The pressurized hydraulic fluid 60 may flow from the manifold 36 through the wellhead 6 and into the wellbore via control line 37c. The pressurized hydraulic fluid 60 may flow down the control line 37c and into the passage 62c via the hydraulic coupling 61c. The hydraulic fluid 60 may exit the passage 62c into the upper hydraulic chamber lower portion and exert pressure on a lower face of the upper piston 52p, thereby driving the upper piston upwardly relative to the housing 51.

Alternatively, a gas power unit may be used instead of the HPU 35 and the hydraulic chambers 57u,b may instead be gas chambers having a gas, such as nitrogen, disposed therein. Alternatively, the drill string 5 may need to be removed for other reasons before reaching total depth, such as for replacement of the drill bit 33b. Alternatively, the HPU 35 and manifold 36 may instead be operated by a technician via a control console (not shown) in communication with the HPU and manifold.

Flow of hydraulic fluid 60 from the closer passage 62c into the lower chamber upper portion may be resisted by the closer detent orifice 64 (closer detent check valve 65 closed). As the upper piston 52p begins to travel, hydraulic fluid 60 displaced from the upper hydraulic chamber upper portion may flow through the opener passage 62o via the bypass check valve 65 of the opener detent 63o and into the control line 37o via the hydraulic coupling 61o. The displaced hydraulic fluid 60 may flow up the control line 37o, through the wellhead 6, and exit the control line 37o into the hydraulic manifold 36. As the upper piston 52p travels and the lower sleeve 52b clears the lower flapper 54b, the tension springs 72, 73 may close the lower flapper. Movement of the upper piston 52p may be halted by abutment of an upper face thereof with the first housing shoulder 58a. Once the lower flapper 54b has closed, injection of the hydraulic fluid 60 may be interrupted and the choke valve 20 may be relaxed to remove backpressure exerted on the lower formation 22b during drilling. Drilling fluid 32 may be circulated (or continue to be circulated) in an upper portion of the wellbore 8 (above the lower flapper) to wash an upper portion of the isolation valve 50.

Injection of the hydraulic fluid 60 may then resume into the opener passage 62o, thereby increasing pressure therein and overcoming the resistance of the closer orifice 64. The hydraulic fluid 60 may exit the passage 62c into the lower hydraulic chamber upper portion and exert pressure on an upper face of the lower piston 53, thereby driving the lower piston downwardly relative to the housing 51. As the lower piston 53 begins to travel, hydraulic fluid 60 displaced from the lower hydraulic chamber lower portion may flow through the opener passage 62o and into the control line 37o via the hydraulic coupling 61o. As the lower piston 53 travels, the cam profile thereof may drive the upper flapper 54u closed. Movement of the lower piston 53 may be halted by abutment of the cam profile with the lower hinge 66b. The PLC 21 may then operate the manifold 35 to shut-in one or both of the control lines 37o,c, thereby hydraulically locking the pistons 52p, 53 in place. Once the upper flapper 54u has been closed, an upper portion of the wellbore 8 may then be vented to atmospheric pressure and the RCD 19 may be deactivated or disconnected from the wellhead 6. The drill string 5 may then be retrieved to the rig 1r.

If total depth has not been reached, the drill bit 33b may be replaced and the drill string 5 may be redeployed into the wellbore 8. Due to the bidirectional isolation by the valve 50, the drill string 5 may be tripped in without concern of momentarily opening the flapper 54 by generating surge pressure. Pressure in the upper portion of the wellbore 8 may then be equalized with pressure in between the flappers 54u,b. The PLC 21 may then operate the manifold 36 to supply pressurized hydraulic fluid to the opener control line 37o while relieving the closer control line 37c, thereby opening the upper flapper 54u. Flow of hydraulic fluid from the opener passage 62o into the upper chamber upper portion may be resisted by the opener detent orifice 64 (opener detent check valve 65 closed). Injection of hydraulic fluid 60 may be interrupted and pressure in the wellbore upper portion may be equalized with pressure in the wellbore lower portion. Injection of hydraulic fluid may resume, thereby opening the lower flapper 54b. Once the lower flapper has been opened, drilling may then resume. In this manner, the lower formation 22b may remain live during tripping due to isolation from the upper portion of the wellbore 8 by the closed isolation valve 50, thereby obviating the need to kill the lower formation 22b.

Once drilling has reached total depth, the drill string 5 may be retrieved to the drilling rig 1r as discussed above. A liner string (not shown) may then be deployed into the wellbore 8 using a work string (not shown). The liner string and workstring may be deployed into the live wellbore 8 using the isolation valve 50, as discussed above for the drill string 5. Once deployed, the liner string may be set in the wellbore 8 using the workstring. The work string may then be retrieved from the wellbore 8 using the isolation valve 50 as discussed above for the drill string 5. The PCA 1p may then be removed from the wellhead 6. A production tubing string (not shown) may be deployed into the wellbore 8 and a production tree (not shown) may then be installed on the wellhead 6. Hydrocarbons (not shown) produced from the lower formation 22b may enter a bore of the liner, travel through the liner bore, and enter a bore of the production tubing for transport to the surface 9.

Alternatively, the hydraulic fluid flow 60 may not be interrupted between the closing and/or opening of the flappers 54u,b in favor of reliance on a sufficient time delay provided by the detents 63c,o.

Figures 5A, 5B:
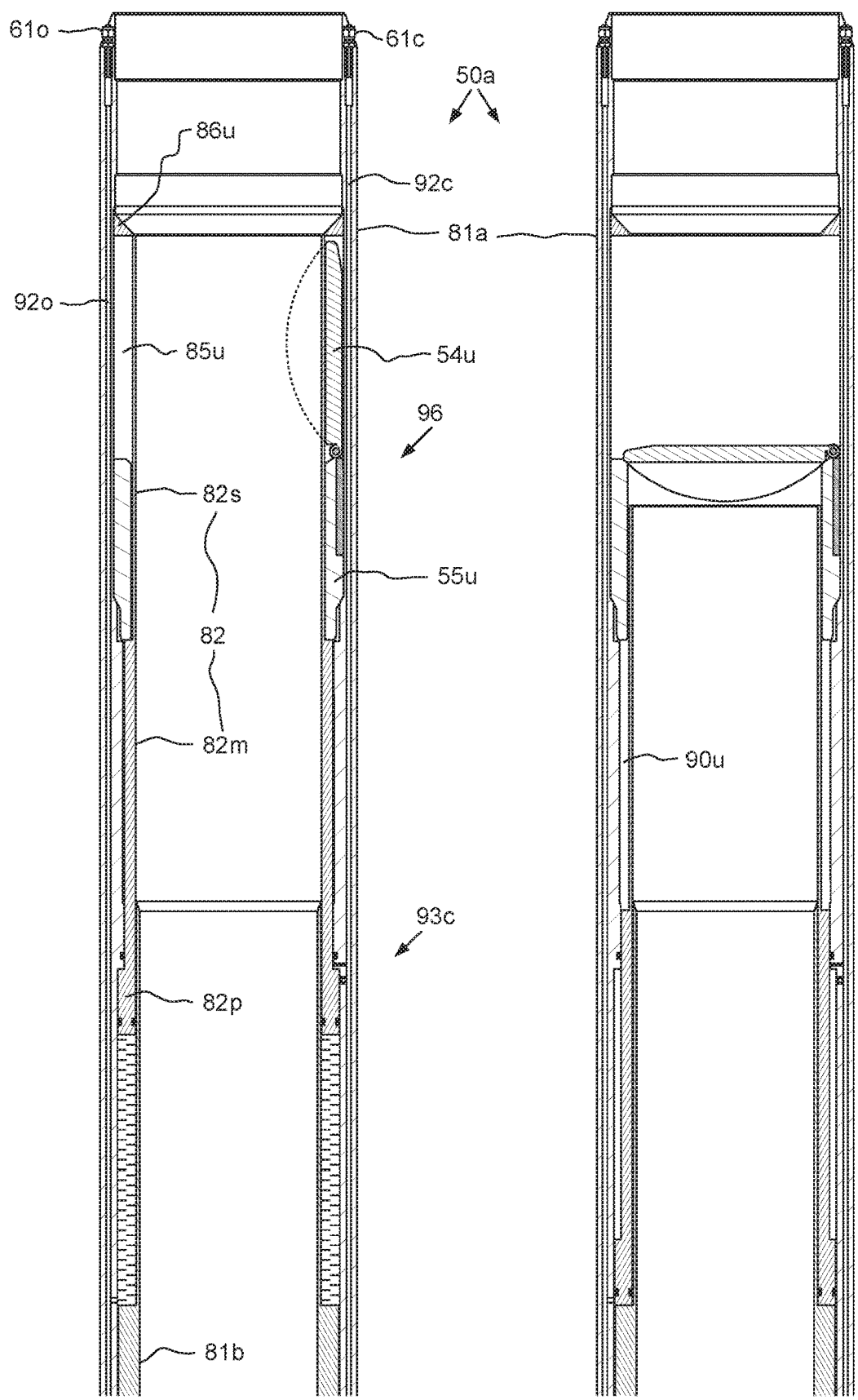
FIG. 5A illustrates an upper portion of an alternative isolation valve in the open position, according to another embodiment of the present disclosure.
FIG. 5B illustrates the upper portion of the alternative isolation valve in the closed position.
Figures 6A, 6B:
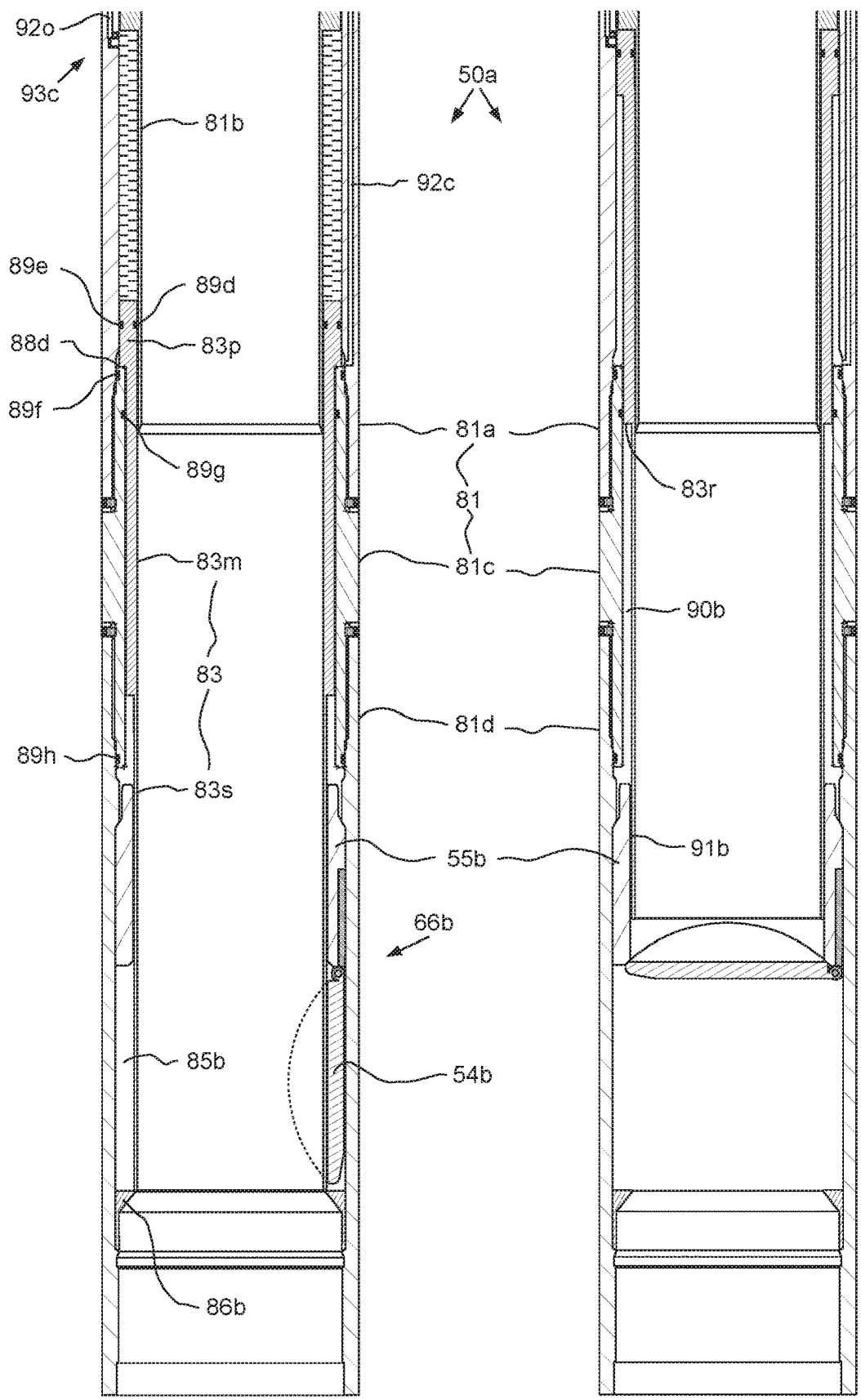
FIG. 6A illustrates a lower portion of the alternative isolation valve in the open position.
FIG. 6B illustrates the lower portion of the alternative isolation valve in the closed position.
Figure 7A:
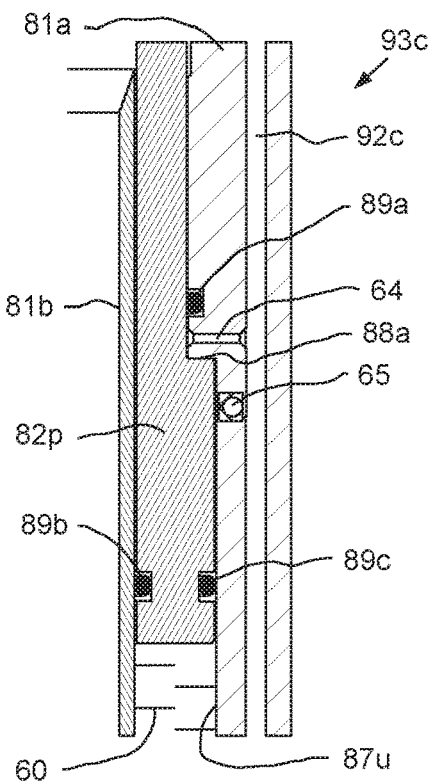
FIGS. 7A and 7B illustrate detents of the alternative isolation valve.
Figure 7B:
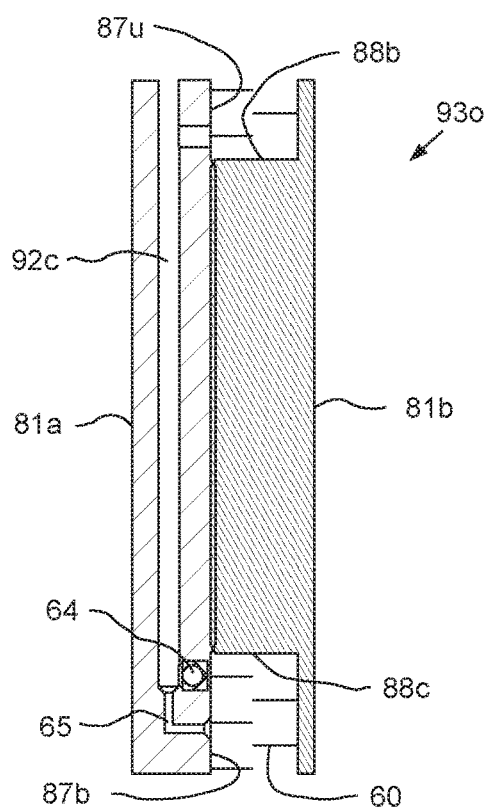

FIG. 5A illustrates an upper portion of an alternative isolation valve 50a in the open position, according to another embodiment of the present disclosure. FIG. 5B illustrates the upper portion of the alternative isolation valve 50a in the closed position. FIG. 6A illustrates a lower portion of the alternative isolation valve 50a in the open position. FIG. 6B illustrates the lower portion of the alternative isolation valve 50a in the closed position. FIGS. 7A and 7B illustrate detents 93c,o of the alternative isolation valve 50a.

The isolation valve 50a may include a tubular housing 81, one or more openers, such as an upper flow tube 82 and a lower flow tube 83, the upper flapper 54u, the lower flapper 54b, the upper seat 55u, the lower seat 55b, an upper receiver 86u, and a lower receiver 86b. To facilitate manufacturing and assembly, the housing 81 may include one or more sections 81a-d each connected together, such as by threaded couplings and/or fasteners. Interfaces between the housing sections 81a-d may be isolated, such as by seals 89f,h. The housing sections 81a-d may further include an upper adapter (not shown) and a lower adapter (not shown), each having a threaded coupling, such as a pin or box, for connection to other members of the inner casing string 11. The valve 50a may have a longitudinal bore therethrough for passage of the drill string 5. Each receiver 86u,b may be connected to the housing 81, such as by threaded couplings.

Each flow tube 82, 83 may be disposed within the housing 81 and be longitudinally movable relative thereto between an upper position and a lower position. Each flow tube 82, 83 may have one or more portions, such as a respective: sleeve 82s, 83s, a piston 82p, 83p, and a mid portion 82m, 83m connecting the sleeve and the piston. Each piston 52p may carry a respective inner seal 89b,d for sealing an interface formed between an inner surface thereof and an outer surface of a bulkhead housing section 81b and a respective outer seal 89c,e for sealing an interface formed between an outer surface thereof and an inner surface of an upper housing section 81a.

Upper 87u and lower 87b hydraulic chambers may be formed in an inner surface of the housing 81. The housing 81 may have shoulders 88a-d formed in an inner surface thereof. The housing 81 may carry an upper seal 89a located adjacent to the first shoulder 88a and a lower seal 89g located adjacent to the fourth shoulder 88d for isolating the chambers 87u,b from a bore of the isolation valve 50a. The upper hydraulic chamber 87u may be defined radially between the upper 81a and bulkhead 81b housing sections and longitudinally between the first and second shoulders 88a,b. The lower hydraulic chamber 87b may be defined radially between the between the upper 81a and bulkhead 81b housing sections and longitudinally between the third and fourth shoulders 88c,d. Hydraulic fluid 60 may be disposed in the chambers 87u,b.

An upper end of the upper chamber 87u and a lower end of the lower chamber 87b may be in fluid communication with the closer hydraulic coupling 61c via a closer hydraulic passage 92c formed through a wall of the body 81. A lower end of the upper chamber 87u and an upper end of the lower chamber 87b may be in fluid communication with the opener hydraulic coupling 61o via an opener hydraulic passage 92o formed through a wall of the body 81.

The fluid communication between the upper end of the upper chamber 87u and the closer passage 92c may be provided by a closer detent 93c. The fluid communication between the lower end of the lower chamber 87b and the opener passage 92o may be provided by an opener detent 93o. Each detent 93c,o may include a choke passage having the orifice 64 and a bypass passage having the check valve 65.

Any of the alternative detents discussed above in relation to the detents 63c,o may be used instead. Alternatively, one or both of the detents 93c,o may be omitted such that the flappers 54u,b may open and/or close simultaneously.

The isolation valve 50a may further include an upper hinge 96 and the lower hinge 66b. Each flapper 54u,b may be pivotally connected to the respective seat 55u,b by the respective hinge 96, 66b. The upper flapper 54u may be positioned above the upper seat 55u such that the upper flapper may open upwardly and the lower flapper 54b may be positioned below the lower seat 55b such that the lower flapper may open downwardly. The upper hinge 96 may be similar to the lower hinge 66b such that both flappers 54u,b may be biased toward the closed position. The upper flapper 54u may be opened and closed by interaction with the upper flow tube 82 and the lower flapper 54b may be opened and closed by interaction with the lower flow tube 83. Upward movement of the upper flow tube 82 may engage the sleeve 82s thereof with the upper flapper 54u, thereby pushing and pivoting the upper flapper to the open position against the tension springs of the hinge 96 due to engagement of a top of the sleeve with an inner surface of the upper flapper. Downward movement of the upper flow tube 82 may disengage the sleeve 82s thereof with the upper flapper 54u, thereby allowing the tension springs of the hinge 96 to pull and pivot the upper flapper to the closed position due to disengagement of the sleeve top from the inner surface of the upper flapper.

Downward movement of the lower flow tube 83 may engage the sleeve 83s thereof with the lower flapper 54b, thereby pushing and pivoting the lower flapper to the open position against the tension springs 72, 73 due to engagement of a bottom of the lower sleeve with an inner surface of the lower flapper. Upward movement of the lower flow tube 83 may disengage the sleeve 83s thereof with the lower flapper 54b, thereby allowing the tension springs 72, 73 to pull and pivot the lower flapper to the closed position due to disengagement of the sleeve bottom from the inner surface of the lower flapper.

Each flapper 54u,b may act as a check valve in the closed position. The upper flapper 54u may be pressed against the upper seat 55u in response to fluid pressure in the valve bore upper portion being greater than fluid pressure in the valve bore lower portion and lower flapper 54b may be pressed against the lower seat 55b in response to fluid pressure in the valve bore lower portion being greater than fluid pressure in the valve bore upper portion. Closure of the dual flappers 54u,b may impart bidirectional capability to the isolation valve 50a. The upper flapper 54u may also serve to protect the lower flapper 54b from dropped objects.

When the upper flow tube 82 is in the upper position and the lower flow tube 83 is in the lower position, an upper flapper chamber 85u and a lower flapper chamber 85b may each be formed radially between the housing 81 and the respective flow tube and each (open) flapper 54u,b may be stowed in the respective flapper chamber.

Alternatively, the upper flapper 54u, upper seat 55u, upper flow tube 82, upper receiver 86u, upper hydraulic chamber 87u, and upper hinge 96 may be flipped such that the upper flapper opens downwardly instead of upwardly and/or the lower flapper 54b, lower seat 55b, lower flow tube 83, lower receiver 86b, lower hydraulic chamber 87b, and lower hinge 66b may be flipped such that the lower flapper opens upwardly instead of downwardly.

Figure 7C:
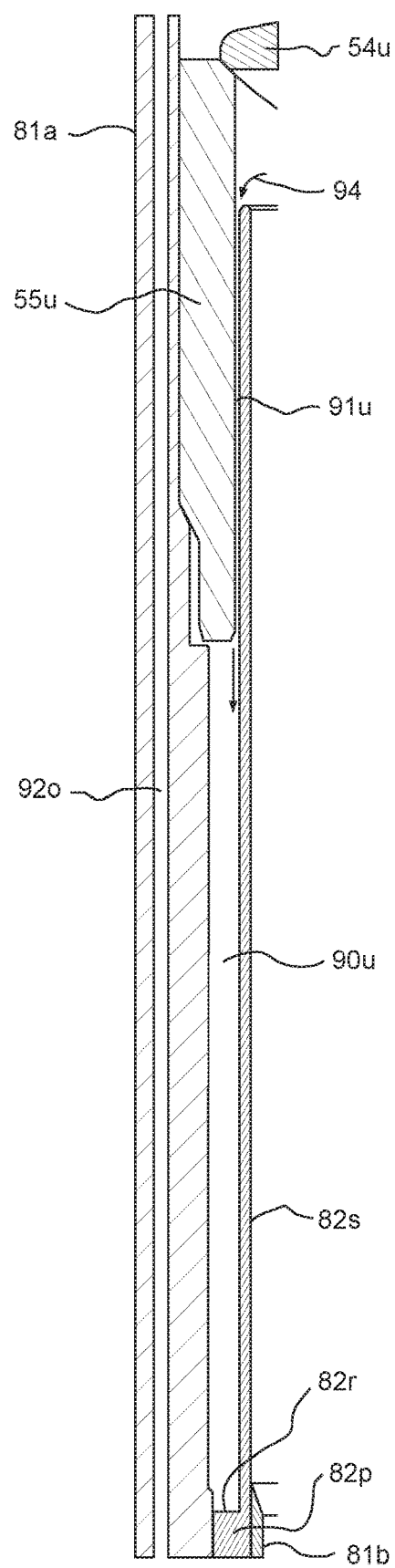
FIG. 7C illustrates an upper closing chamber of the alternative isolation valve.

FIG. 7C illustrates an upper closing chamber 90u of the alternative isolation valve 50a. As the upper flow tube 82 is moving from the upper position to the lower position, an upper closing chamber 90u may be formed. The upper closing chamber 90u may be formed radially between an inner surface of the upper housing section 81a and an outer surface of the upper flow tube sleeve 82s and longitudinally between a lower end of the upper seat 55u and a shoulder 82r of the upper flow tube 82. The upper closing chamber 90u may be in fluid communication with a bore of the isolation valve 50a via an upper passage 91u formed between an outer surface of the upper flow tube sleeve 82s and an inner surface of the upper seat 55u. As the upper flow tube 82 moves downward, wellbore fluid 94 may be drawn into the upper closing chamber 90u via the passage 91u, thereby increasing volume and reducing pressure in a portion of the isolation valve bore between the flappers 54u,b. This increased volume may facilitate closing of the upper flapper 54u by preventing a hydraulic lock from obstructing closure of the upper flapper and/or erosion of the inner periphery of the upper flapper and/or sealing profile of the upper seat 55u by fluid flow therebetween during closing. This reduced pressure may also initiate closing of the upper flapper 54u, thereby obviating the need for the kickoff spring 74.

A lower closing chamber 90b may be formed radially between an inner surface of the mid housing section 81c and an outer surface of the lower flow tube sleeve 83s and longitudinally between an upper end of the lower seat 55b and a shoulder 83r of the lower flow tube 82. The lower closing chamber 90b may be in fluid communication with a bore of the isolation valve 50a via a lower passage 91b formed between an outer surface of the lower flow tube sleeve 83s and an inner surface of the lower seat 55b.

FIGS. 8A-8D illustrate an offshore drilling system 101 in a tripping mode, according to another embodiment of the present disclosure. The offshore drilling system 101 may include a mobile offshore drilling unit (MODU) 101m, such as a semi-submersible, the drilling rig 1r, a fluid handling system 101f, a fluid transport system 101t, a pressure control assembly (PCA) 101p, and a drill string 105.

The MODU 101m may carry the drilling rig 1r and the fluid handling system 101f aboard and may include a moon pool, through which drilling operations are conducted. The semi-submersible MODU 101m may include a lower barge hull which floats below a surface (aka waterline) 102s of sea 102 and is, therefore, less subject to surface wave action. Stability columns (only one shown) may be mounted on the lower barge hull for supporting an upper hull above the waterline. The upper hull may have one or more decks for carrying the drilling rig 1r and fluid handling system 101h. The MODU 101m may further have a dynamic positioning system (DPS) (not shown) or be moored for maintaining the moon pool in position over a subsea wellhead 110.

Alternatively, the MODU may be a drill ship. Alternatively, a fixed offshore drilling unit or a non-mobile floating offshore drilling unit may be used instead of the MODU.

The drilling rig 1r may further include a drill string compensator (not shown) to account for heave of the MODU 101m. The drill string compensator may be disposed between the traveling block 14 and the top drive 13 (aka hook mounted) or between the crown block 16 and the derrick 2 (aka top mounted). The drill string 105 may include a BHA and the conveyor string 5p. The BHA may be connected to the conveyor string 5p, such as by a threaded connection, and include the drill bit 33b, the drill collars 33c, a shifting tool 150, and a ball catcher (not shown).

The fluid transport system 101t may include an upper marine riser package (UMRP) 120, a marine riser 125, a booster line 127, and a choke line 128. The riser 125 may extend from the PCA 101p to the MODU 101m and may connect to the MODU via the UMRP 120. The UMRP 120 may include a diverter 121, a flex joint 122, a slip (aka telescopic) joint 123, a tensioner 124, and an RCD 126. A lower end of the RCD 126 may be connected to an upper end of the riser 125, such as by a flanged connection. The slip joint 123 may include an outer barrel connected to an upper end of the RCD 126, such as by a flanged connection, and an inner barrel connected to the flex joint 122, such as by a flanged connection. The outer barrel may also be connected to the tensioner 124, such as by a tensioner ring (not shown).

The flex joint 122 may also connect to the diverter 121, such as by a flanged connection. The diverter 121 may also be connected to the rig floor 3, such as by a bracket. The slip joint 123 may be operable to extend and retract in response to heave of the MODU 101m relative to the riser 125 while the tensioner 124 may reel wire rope in response to the heave, thereby supporting the riser 125 from the MODU 101m while accommodating the heave. The riser 125 may have one or more buoyancy modules (not shown) disposed therealong to reduce load on the tensioner 124.

The RCD 126 may include a housing, a piston, a latch, and a bearing assembly. The housing may be tubular and have one or more sections connected together, such as by flanged connections. The bearing assembly may include a bearing pack, a housing seal assembly, one or more strippers, and a catch sleeve. The bearing assembly may be selectively longitudinally and torsionally connected to the housing by engagement of the latch with the catch sleeve. The housing may have hydraulic ports in fluid communication with the piston and an interface of the RCD 126. The bearing pack may support the strippers from the sleeve such that the strippers may rotate relative to the housing (and the sleeve). The bearing pack may include one or more radial bearings, one or more thrust bearings, and a self contained lubricant system. The bearing pack may be disposed between the strippers and be housed in and connected to the catch sleeve, such as by a threaded connection and/or fasteners.

Each stripper may include a gland or retainer and a seal. Each stripper seal may be directional and oriented to seal against the drill pipe of the conveyor string 5*p* in response to higher pressure in the riser 125 than the UMRP 120. Each stripper seal may have a conical shape for fluid pressure to act against a respective tapered surface thereof, thereby generating a sealing pressure against the drill pipe. Each stripper seal may have an inner diameter slightly less than a pipe diameter of the drill pipe to form an interference fit therebetween. Each stripper seal may be flexible enough to accommodate and seal against threaded couplings of the drill pipe having a larger tool joint diameter. The drill pipe may be received through a bore of the bearing assembly so that the stripper seals may engage the drill pipe. The stripper seals may provide a desired barrier in the riser 125 either when the drill pipe is stationary or rotating. The RCD 126 may be submerged adjacent the waterline 102*s*. The RCD interface may be in fluid communication with an auxiliary hydraulic power unit (HPU) (not shown) of the PLC 21 via an auxiliary umbilical 118.

Alternatively, an active seal RCD may be used. Alternatively, the RCD may be located above the waterline and/or along the UMRP at any other location besides a lower end thereof. Alternatively, the RCD may be assembled as part of the riser at any location therealong or as part of the PCA. Alternatively, the riser and UMRP may be omitted. Alternatively, the auxiliary umbilical may be in communication with a control console (not shown) instead of the PLC.

The PCA 101*p* may be connected to the wellhead 110 located adjacent to a floor 102*f* of the sea 102. A conductor string 107 may be driven into the seafloor 102*f*. The conductor string 107 may include a housing and joints of conductor pipe connected together, such as by threaded connections. Once the conductor string 107 has been set, a subsea wellbore 108 may be drilled into the seafloor 102*f* and a casing string 111 may be deployed into the wellbore. The wellhead housing may land in the conductor housing during deployment of the casing string 111. The casing string 111 may be cemented 112 into the wellbore 108. The casing string 111 may extend to a depth adjacent a bottom of the upper formation 22*u*.

The casing string 111 may include a wellhead housing, joints of casing connected together, such as by threaded connections, and an isolation assembly 200*o,c*, 50*b* connected to the casing joints, such as by a threaded connection. The isolation assembly 200*o,c*, 50*b* may include one or more downhole hydraulic power units (DHPU), such as an opener 200*o* and a closer 200*c*, and an isolation valve 50*b*. The isolation assembly 200*o,c*, 50*b* may further include a spacer sub (not shown) disposed between the closer 200*c* and the isolation valve 50*b* and/or between the opener 200*o* and the closer. The DHPUs 200*o,c* may be hydraulically connected to the isolation valve 50*b* in a three-way configuration such that operation of one of the DHPUs 200*o,c* will operate the isolation valve 50*b* between the open and closed positions and alternate the other DHPU 200*o,c*. This three way configuration may allow each DHPU 200*o,c* to be operated in only one rotational direction and each DHPU to only open or close the isolation valve 50*b*. Respective hydraulic couplings (not shown) of each DHPU 200*o,c* and the hydraulic couplings 57*a,b* of the isolation valve 50*b* may be connected by respective conduits 245*a-c*, such as tubing.

The PCA 101*p* may include a wellhead adapter 40*b*, one or more flow crosses 41*u,m,b*, one or more blow out preventers (BOPs) 42*a,u,b*, a lower marine riser package (LMRP), one or more accumulators 44, and a receiver 46. The LMRP may include a control pod 116, a flex joint 43, and a connector 40*u*. The wellhead adapter 40*b*, flow crosses 41*u,m,b*, BOPs 42*a,u,b*, receiver 46, connector 40*u*, and flex joint 43, may each include a housing having a longitudinal bore therethrough and may each be connected, such as by flanges, such that a continuous bore is maintained therethrough. The bore may have drift diameter, corresponding to a drift diameter of the wellhead 110. The flex joints 123, 43 may accommodate respective horizontal and/or rotational (aka pitch and roll) movement of the MODU 101*m* relative to the riser 125 and the riser relative to the PCA 101*p*.

Each of the connector 40*u* and wellhead adapter 40*b* may include one or more fasteners, such as dogs, for fastening the LMRP to the BOPs 42*a,u,b* and the PCA 1*p* to an external profile of the wellhead housing, respectively. Each of the connector 40*u* and wellhead adapter 40*b* may further include a seal sleeve for engaging an internal profile of the respective receiver 46 and wellhead housing. Each of the connector 40*u* and wellhead adapter 40*b* may be in electric or hydraulic communication with the control pod 116 and/or further include an electric or hydraulic actuator and an interface, such as a hot stab, so that a remotely operated subsea vehicle (ROV) (not shown) may operate the actuator for engaging the dogs with the external profile.

The LMRP may receive a lower end of the riser 125 and connect the riser to the PCA 101*p*. The control pod 116 may be in electric, hydraulic, and/or optical communication with the PLC 21 onboard the MODU 101*m* via an umbilical 117. The control pod 116 may include one or more control valves (not shown) in communication with the BOPs 42*a,u,b* for operation thereof. Each control valve may include an electric or hydraulic actuator in communication with the umbilical 117. The umbilical 117 may include one or more hydraulic and/or electric control conduit/cables for the actuators. The accumulators 44 may store pressurized hydraulic fluid for operating the BOPs 42*a,u,b*. Additionally, the accumulators 44 may be used for operating one or more of the other components of the PCA 101*p*. The control pod may further include control valves for operating the other functions of the PCA 1 *p*. The PLC 21 may operate the PCA 101*p* via the umbilical 117 and the control pod 116.

A lower end of the booster line 127 may be connected to a branch of the flow cross 41*u* by a shutoff valve 45*a*. A booster manifold may also connect to the booster line lower end and have a prong connected to a respective branch of each flow cross 41*m,b*. Shutoff valves 45*b,c* may be disposed in respective prongs of the booster manifold. Alternatively, a separate kill line (not shown) may be connected to the branches of the flow crosses 41*m,b* instead of the booster manifold. An upper end of the booster line 127 may be connected to an outlet of a booster pump (not shown). A lower end of the choke line 128 may have prongs connected to respective second branches of the flow crosses 41m,b. Shutoff valves 45d,e may be disposed in respective prongs of the choke line lower end.

A pressure sensor 47a may be connected to a second branch of the upper flow cross 41u. Pressure sensors 47b,c may be connected to the choke line prongs between respective shutoff valves 45d,e and respective flow cross second branches. Each pressure sensor 47a-c may be in data communication with the control pod 116. The lines 127, 128 and umbilical 117 may extend between the MODU 1m and the PCA 1p by being fastened to brackets disposed along the riser 125. Each shutoff valve 45a-e may be automated and have a hydraulic actuator (not shown) operable by the control pod 116.

Alternatively, the umbilical may be extended between the MODU and the PCA independently of the riser. Alternatively, the shutoff valve actuators may be electrical or pneumatic.

The fluid handling system 101f may include a return line 129, the mud pump 24, the shale shaker 33, the flow meters 27d,r, the pressure sensors 28d,r, the choke 20, the supply line 30p,h, the feed line, the degassing spool (not shown), the drilling fluid tank 25, a tag reader 132, and one or more launchers, such as tag launcher 131t and plug launcher 131b. A lower end of the return line 129 may be connected to an outlet of the RCD 126 and an upper end of the return line may be connected to an inlet of the shaker 26. The returns pressure sensor 28r, choke 20, returns flow meter 27r, and tag reader 132 may be assembled as part of the return line 129. A transfer line 130 may connect an outlet of the tank 25 to an inlet of the mud pump 24.

Each launcher 131b,t may be assembled as part of the drilling fluid supply line 30p,h. Each launcher 131b,t may include a housing, a plunger, and an actuator. The tag launcher 131t may further include a magazine (not shown) having a plurality of radio frequency identification (RFID) tags loaded therein. A chambered RFID tag 290 may be disposed in the plunger for selective release and pumping downhole to communicate wirelessly with one or more sensor subs 282u,b. The plunger of each launcher 131b,t may be movable relative to the respective launcher housing between a capture position and a release position. The plunger may be moved between the positions by the actuator. The actuator may be hydraulic, such as a piston and cylinder assembly and may be in communication with the PLC HPU.

Alternatively, the actuator may be electric or pneumatic. Alternatively, the actuator may be manual, such as a handwheel. Alternatively, the tags 290 may be any other kind of wireless identification tags, such as acoustic. Alternatively, the tags may be manually launched by breaking a connection in the supply line.

Figure 8C:
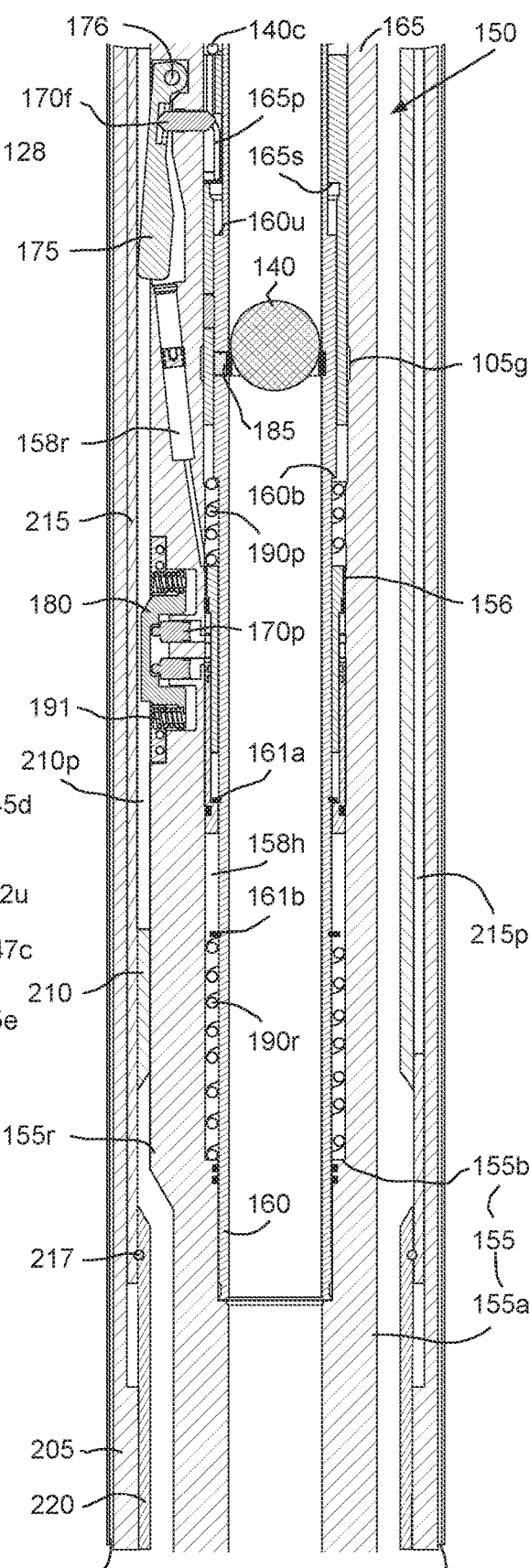

Referring specifically to FIGS. 8C and 8D, each DHPU 200o,c may include a tubular housing 205, a tubular mandrel 210, a release sleeve 215, a release piston 220, a control valve 225, hydraulic circuit, and a pump 250. The housing 205 may have couplings (not shown) formed at each longitudinal end thereof for connection between the DHPUs 200o,c, with the spacer sub, or with other components of the casing string 111. The couplings may be threaded, such as a box and a pin. The housing 205 may have a longitudinal bore formed therethrough. The housing 205 may include two or more sections (only one section shown) to facilitate manufacturing and assembly, each section connected together, such as fastened with threaded connections.

The mandrel 210 may be disposed within the housing 205, longitudinally connected thereto, and rotatable relative thereto. The mandrel 210 may have a profile 210p formed through a wall thereof for receiving a respective driver 180 and release 175 of the shifting tool 150. The mandrel profile 210p may be a series of slots spaced around the mandrel inner surface. The mandrel slots may have a length equal to, greater than, or substantially greater than a length of a ribbed portion 155 of the shifting tool 150 to provide an engagement tolerance and/or to compensate for heave of the drill string 105 for subsea drilling operations.

The release piston 220 may be tubular and have a shoulder (not shown) disposed in a chamber (not shown) formed in the housing 205 between an upper shoulder (not shown) of the housing and a lower shoulder (not shown) of the housing. The chamber may be defined radially between the release piston 220 and the housing 205 and longitudinally between an upper seal disposed between the housing 205 and the release piston 220 proximate the upper shoulder and a lower seal disposed between the housing and the release piston proximate the lower shoulder. A piston seal may also be disposed between the release piston shoulder and the housing 205. Hydraulic fluid may be disposed in the chamber. A second hydraulic passage 235 formed in the housing 205, may selectively provide (discussed below) fluid communication between the chamber and a hydraulic reservoir 231r formed in the housing.

The release piston 220 may be longitudinally connected to the release sleeve 215, such as by bearing 217, so that the release sleeve may rotate relative to the release piston. The release sleeve 215 may be operably coupled to the mandrel 210 by a cam profile (not shown) and one or more followers (not shown). The cam profile may be formed in an inner surface of the release sleeve 215 and the follower may be fastened to the mandrel 210 and extend from the mandrel outer surface into the profile or vice versa. The cam profile may repeatedly extend around the sleeve inner surface so that the cam follower continuously travels along the profile as the sleeve 215 is moved longitudinally relative to the mandrel 210 by the release piston 220.

Engagement of the cam follower with the cam profile may rotationally connect the mandrel 210 and the sleeve 215 when the cam follower is in a straight portion of the cam profile and cause limited relative rotation between the mandrel and the sleeve as the follower travels through a curved portion of the profile. The cam profile may be a V-slot. The release sleeve 215 may have a release profile 215p formed through a wall thereof for receiving the shifting tool release 175. The release profile 215p may be a series of slots spaced around the sleeve inner surface. The release slots may correspond to the mandrel slots. The release slots may be oriented relative to the cam profile so that the release slots are aligned with the mandrel slots when the cam follower is at a bottom of the V-slot and misaligned when the cam follower is at any other location of the V-slot (covering the mandrel slots with the sleeve wall).

The control valve 225 may be tubular and be disposed in the housing chamber. The control valve 225 may be longitudinally movable relative to the housing 205 between a lower position and an upper position. The control valve 225 may have an upper shoulder (not shown) and a lower shoulder (not shown) connected by a control sleeve (not shown) and a latch (not shown) extending from the lower shoulder. The control valve 225 may also have a port (not shown) formed through the control sleeve. The upper shoulder may carry a pair of seals in engagement with the housing 205. In the lower position, the seals may straddle a hydraulic port 236 formed in the housing 205 and in fluid communication with a first hydraulic passage 234 formed in the housing 205, thereby preventing fluid communication between the hydraulic passage and an upper face of the release piston shoulder.

In the lower position, the upper shoulder 225u may also expose another hydraulic port (not shown) formed in the housing 205 and in fluid communication with the second hydraulic passage 235. The port may provide fluid communication between the second hydraulic passage 235 and the upper face of the release piston shoulder via a passage formed between an inner surface of the upper shoulder and an outer surface of the release piston 220. In the upper position, the upper shoulder seals may straddle the hydraulic port, thereby preventing fluid communication between the second hydraulic passage 235 and the upper face of the release piston shoulder. In the upper position, the upper shoulder may also expose the hydraulic port 236, thereby providing fluid communication between the first hydraulic passage 234 and the upper face of the release piston shoulder via the ports 236.

The control valve 225 may be operated between the upper and lower positions by interaction with the release piston 220 and the housing 205. The control valve 225 may interact with the release piston 220 by one or more biasing members, such as springs (not shown) and with the housing by the latch. The upper spring may be disposed between the upper valve shoulder and the upper face of the release piston shoulder and the lower spring may be disposed between the lower face of the release piston shoulder and the lower valve shoulder. The housing 205 may have a latch profile formed adjacent the lower shoulder. The latch profile may receive the valve latch, thereby fastening the control valve 225 to the housing 205 when the control valve is in the lower position. The upper spring may bias the upper valve shoulder toward the upper housing shoulder and the lower spring may bias the lower valve shoulder toward the lower housing shoulder.

As the release piston shoulder moves longitudinally downward toward the lower shoulder, the biasing force of the upper spring may decrease while the biasing force of the lower spring increases. The latch and profile may resist movement of the control valve 225 until or almost until the release piston shoulder reaches an end of a lower stroke. Once the biasing force of the lower spring exceeds the resistance of the latch and latch profile, the control valve 225 may snap from the upper position to the lower position. Movement of the control valve 225 from the lower position to the upper position may similarly occur by snap action when the biasing force of the upper spring against the upper valve shoulder exceeds the resistance of the latch and latch profile.

The pump 250 may include one or more (five shown) pistons each disposed in a respective piston chamber formed in the housing 205. Each piston may interact with the mandrel 210 via a swash bearing (not shown). The swash bearing may include a rolling element disposed in an eccentric groove formed in an outer surface of the mandrel 210 and connected to a respective piston. Each piston chamber may be in fluid communication with a respective hydraulic conduit 233 formed in the housing 205. Each hydraulic conduit 233 may be in selective fluid communication with the reservoir 231r via a respective inlet check valve 232i and may be in selective fluid communication with a pressure chamber 231p via a respective outlet check valve 232o. The inlet check valve 232i may allow hydraulic fluid flow from the reservoir 231r to each piston chamber and prevent reverse flow therethrough and the outlet check valve 232O may allow hydraulic fluid flow from each piston chamber to the pressure chamber 231p and prevent reverse flow therethrough.

In operation, as the mandrel 210 is rotated 4 by the shifting tool driver 180, the eccentric angle of the swash bearing may cause reciprocation of the pump pistons. As each pump piston travels longitudinally downward relative to the chamber, the piston may draw hydraulic fluid from the reservoir 231r via the inlet check valve 232i and the conduit 233. As each pump piston reverses and travels longitudinally upward relative to the respective piston chamber, the piston may drive the hydraulic fluid into the pressure chamber 231p via the conduit 233 and the outlet check valve 232o. The pressurized hydraulic fluid may then flow along the first hydraulic passage 234 to the isolation valve 50b via respective hydraulic conduit 245a,b, thereby opening or closing the isolation valve (depending on whether the DHPU is the opener 200o or the closer 200c).

Hydraulic fluid displaced by operation of the isolation valve 50b may be received by the first hydraulic passage 234 via the respective conduit 245a,b. The lower face of the release piston shoulder may receive the exhausted hydraulic fluid via a flow space formed between the lower face of the lower valve shoulder, leakage through the latch, and a flow passage formed between an inner surface of the lower valve shoulder and an outer surface of the release piston 220. Pressure exerted on the lower face of the release piston shoulder may move the release piston 220 longitudinally upward until the control valve 225 snaps into the upper position. Hydraulic fluid may be exhausted from the housing chamber to the reservoir 231r via the second hydraulic passage 235. When the other one of the DHPUs 200o,c is operated, hydraulic fluid exhausted from the isolation valve 50b may be received via the first hydraulic passage 234. As discussed above, the upper face of the release piston shoulder may be in fluid communication with the first hydraulic passage 234. Pressure exerted on the upper face of the release piston shoulder may move the release piston 220 longitudinally downward until the control valve 225 snaps into the lower position. Hydraulic fluid may be exhausted from the housing chamber to the other DHPU 200o,c via a third hydraulic passage 237 formed in the housing 205 and hydraulic conduit 245c.

To account for thermal expansion of the hydraulic fluid, the lower portion of the housing chamber (below the seal of the valve sleeve and the seal of the release piston shoulder) may be in selective fluid communication with the reservoir 231r via the second hydraulic passage 235, a pilot-check valve 239, and the third hydraulic passage 237. The pilot-check valve 239 may allow fluid flow between the reservoir 231r and the housing chamber lower portion (both directions) unless pressure in the housing chamber lower portion exceeds reservoir pressure by a preset nominal pressure. Once the preset pressure is reached, the pilot-check valve 239 may operate as a conventional check valve oriented to allow flow from the reservoir 231r to the housing chamber lower portion and prevent reverse flow therethrough. The reservoir 231r may be divided into an upper portion and a lower portion by a compensator piston. The reservoir upper portion may be sealed at a nominal pressure or maintained at wellbore pressure by a vent (not shown). To prevent damage to the DHPU 200o,c or the isolation valve 50b by continued rotation of the drill string 105 after the isolation valve has been opened or closed by the respective DHPU 200o,c, the pressure chamber 231p may be in selective fluid communication with the reservoir 231r via a pressure relief valve 240. The pressure relief valve 240 may prevent fluid communication between the reservoir and the pressure chamber unless pressure in the pressure chamber exceeds pressure in the reservoir by a preset pressure.

The shifting tool 150 may include a tubular housing 155, a tubular mandrel 160, one or more releases 175, and one or more drivers 180. The housing 155 may have couplings (not shown) formed at each longitudinal end thereof for connection with other components of the drill string 110. The couplings may be threaded, such as a box and a pin. The housing 155 may have a longitudinal bore formed therethrough for conducting drilling fluid. The housing 155 may include two or more sections 155a,c. The housing section 155c may be fastened to the housing section 155a. The housing 155 may have a groove 155g and upper (not shown) and lower 155b shoulders formed therein, and a wall of the housing 155 may have one or more holes formed therethrough.

The mandrel 160 may be disposed within the housing 155 and longitudinally movable relative thereto between a retracted position (not shown) and an extended position (shown). The mandrel 160 may have upper and lower shoulders 160u,b formed therein. A seat 185 may be fastened to the mandrel 160 for receiving a pump down plug, such as a ball 140, launched by the plug launcher 131b and pumped through the drill string 105. The seat 185 may include an inner fastener, such as a snap ring or segmented ring, and one or more intermediate and outer fasteners, such as dogs. Each intermediate dog may be disposed in a respective hole formed through a wall of the mandrel 160. Each outer dog may be disposed in a respective hole formed through a wall of cam 165. Each outer dog may engage an inner surface of the housing 155 and each intermediate dog may extend into a groove formed in an inner surface of the mandrel 160. The seat ring may be biased into engagement with and be received by the mandrel groove except that the dogs may prevent engagement of the seat ring with the groove, thereby causing a portion of the seat ring to extend into the mandrel bore to receive the ball 140. The mandrel 160 may also carry one or more fasteners, such as snap rings 161a,b. The mandrel 160 may also be rotationally connected to the housing 155.

The cam 165 may be a sleeve disposed within the housing 155 and longitudinally movable relative thereto between a retracted position (not shown), an orienting position (not shown), an engaged position (shown), and a released position (not shown). The cam 165 may have a shoulder 165s formed therein and a profile 165p formed in an outer surface thereof. The profile 165p may have a tapered portion for pushing a follower 170f radially outward and be fluted for pulling the follower radially inward. The follower 170f may have an inner tongue engaged with the flute. The cam 165 may interact with the mandrel 160 by being longitudinally disposed between the snap ring 161a and the upper mandrel shoulder 160u and by having a shoulder 165s engaged with the upper mandrel shoulder in the retracted position. A spring 140c may be disposed between a snap ring (not shown) and a top of the cam 165, thereby biasing the cam toward the engaged position. Alternatively, the cam profile 165p may be formed by inserts instead of in a wall of the cam 165.

A longitudinal piston 195 may be a sleeve disposed within the housing 155 and longitudinally movable relative thereto between a retracted position (not shown), an orienting position (not shown), and an engaged position (shown). The piston 195 may interact with the mandrel 160 by being longitudinally disposed between the snap ring 161b and the lower mandrel shoulder 160b. A spring 190p, may be disposed between the lower mandrel shoulder 160b and a top of the piston 195, thereby biasing the piston toward the engaged position. A bottom of the piston 195 may engage the snap ring 161b in the retracted position.

One or more ribs 155r may be formed in an outer surface of the housing 155. Upper and lower pockets may be formed in each rib 155r for the release 175 and the driver 180, respectively. The release 175, such as an arm, and the driver 180, such as a dog, may be disposed in each respective pocket in the retracted position. The release 175 may be pivoted to the housing by a fastener 176. The follower 170f may be disposed through a hole formed through the housing wall. The follower 170f may have an outer tongue engaged with a flute formed in an inner surface of the release 175, thereby accommodating pivoting of the release relative to the housing 155 while maintaining radial connection (pushing and pulling) between the follower and the release. One or more seals may be disposed between the follower 170f and the housing 155. The release 175 may be rotationally connected to the housing 155 via capture of the upper end in the upper pocket by the pivot fastener 176.

Alternatively, the ribs 155r may be omitted and the mandrel profile 210p may have a length equal to, greater than, or substantially greater than a combined length of the release 175 and the driver 180.

An inner portion of the driver 180 may be retained in the lower pocket by upper and lower keepers fastened to the housing 155. Springs 191 may be disposed between the keepers and lips of the driver 180, thereby biasing the driver radially inward into the lower pocket. One or more radial pistons 170p may be disposed in respective chambers formed in the lower pocket. A port may be formed through the housing wall providing fluid communication between an inner face of each radial piston 170p and a lower face of the longitudinal piston 195. An outer face of each radial piston 170p may be in fluid communication with the wellbore. Downward longitudinal movement of the longitudinal piston 195 may exert hydraulic pressure on the radial pistons 170p, thereby pushing the drivers 180 radially outward.

A chamber 158h may be formed radially between the mandrel 160 and the housing 155. A reservoir 158r may be formed in each of the ribs 155. A compensator piston may be disposed in each of the reservoirs 158r and may divide the respective reservoir into an upper portion and a lower portion. The reservoir upper portion may be in communication with the wellbore 108 via the upper pocket. Hydraulic fluid may be disposed in the chamber 158h and the lower portions of each reservoir 158r. The reservoir lower portion may be in fluid communication with the chamber 158h via a hydraulic conduit formed in the respective rib. A bypass 156 may be formed in an inner surface of the housing 155. The bypass 156 may allow leakage around seals of the longitudinal piston 195 when the piston is in the retracted position (and possibly the orienting position). Once the longitudinal 195 piston moves downward and the seals move past the bypass 156, the longitudinal piston seals may isolate a portion of the chamber 158h from the rest of the chamber.

A spring 190r may be disposed against the snap ring 161b and the lower shoulder 155b, thereby biasing the mandrel 160 toward the retracted position. In addition to the spring 190r, a bottom of the mandrel 160 may have an area greater than a top of the mandrel 160, thereby serving to bias the mandrel 160 toward the retracted position in response to fluid pressure (equalized) in the housing bore. The cam profiles 165p and radial piston ports may be sized to restrict flow of hydraulic fluid therethrough to dampen movement of the respective cam 165 and radial pistons 170*p* between their respective positions.

Figures 9A, 9B:
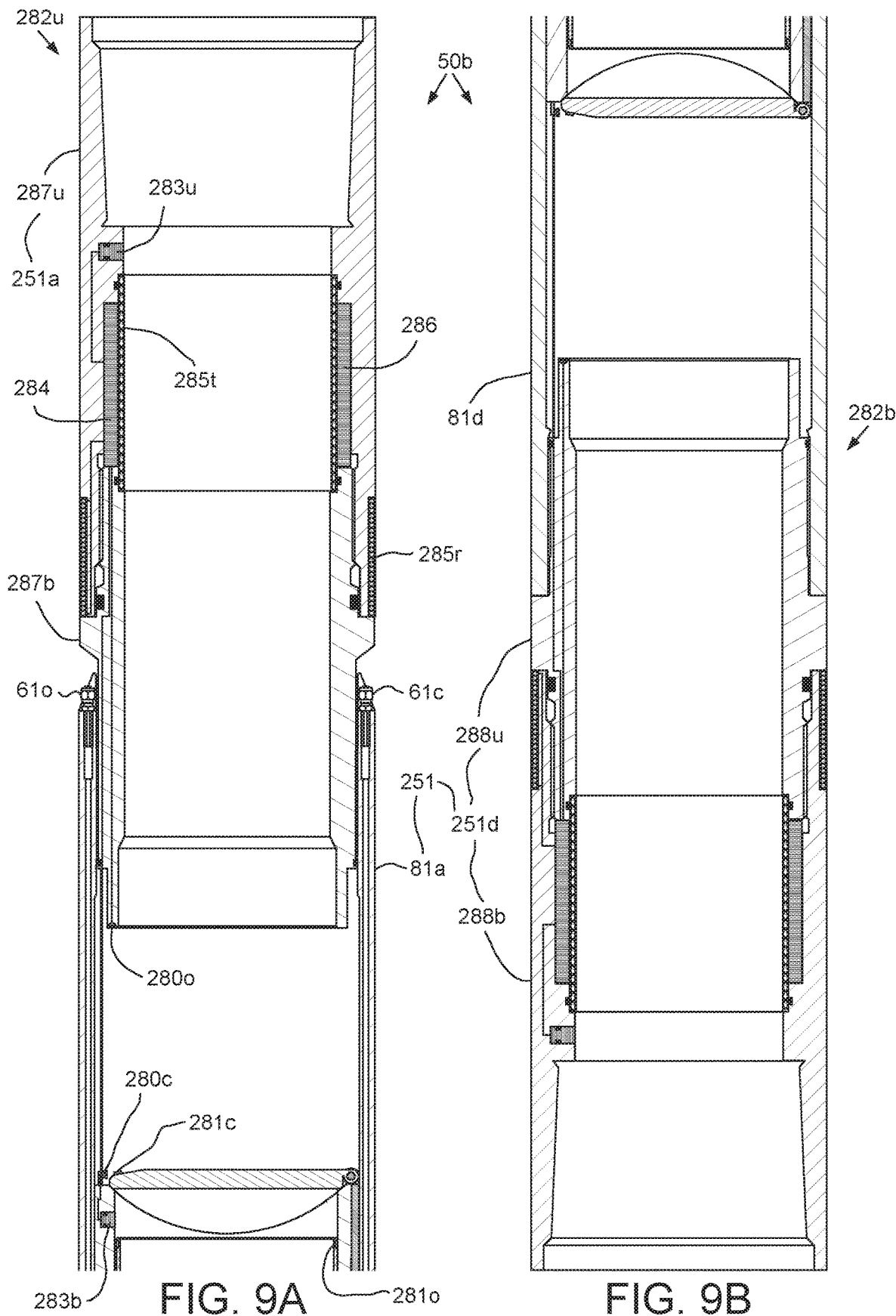
FIGS. 9A and 9B illustrate an isolation valve of the offshore drilling system.
Figure 10H:
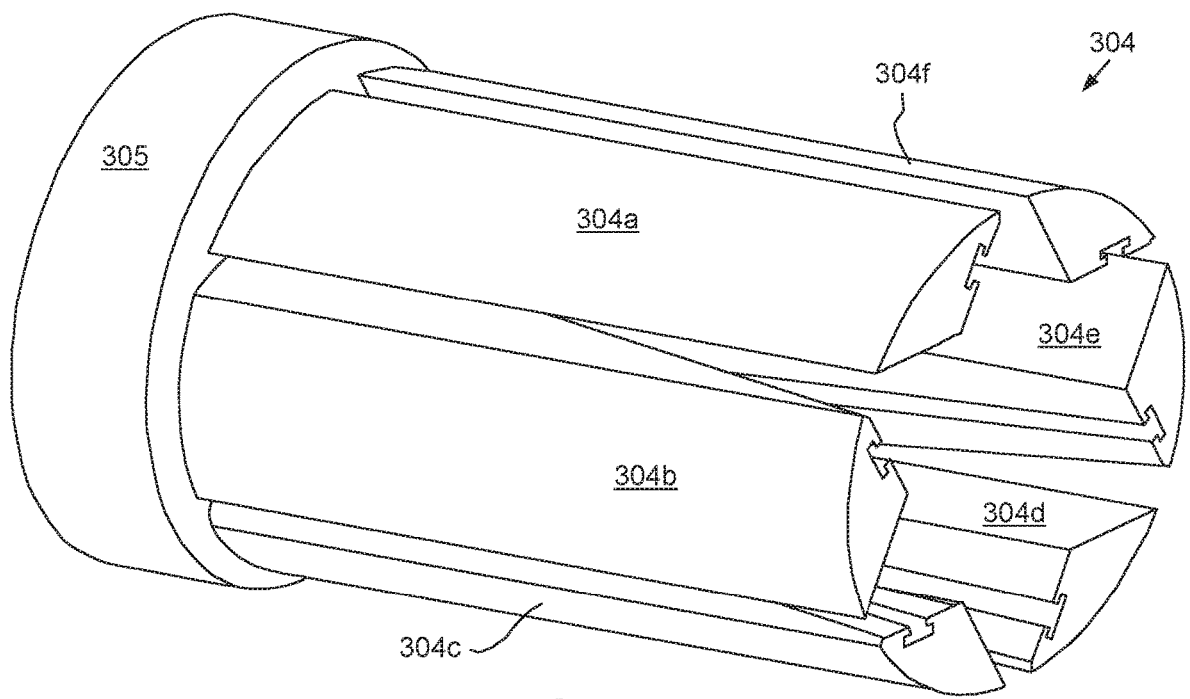
Figures 10I, 10J:
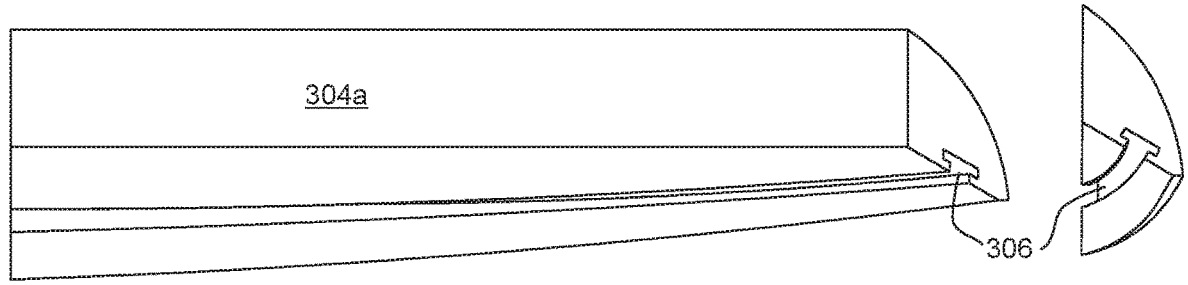
Figure 10K:
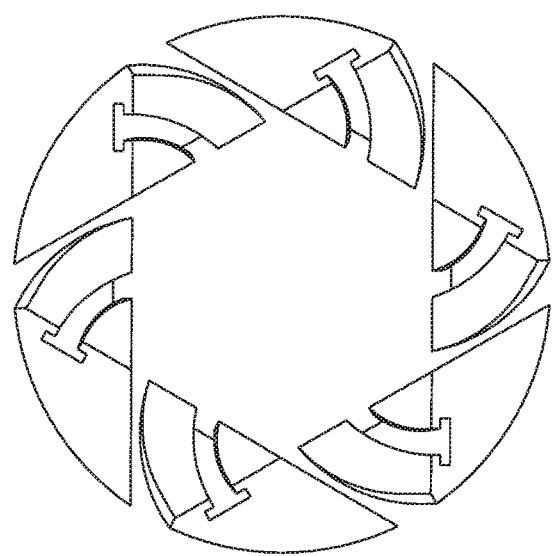
Figures 11A, 11B:
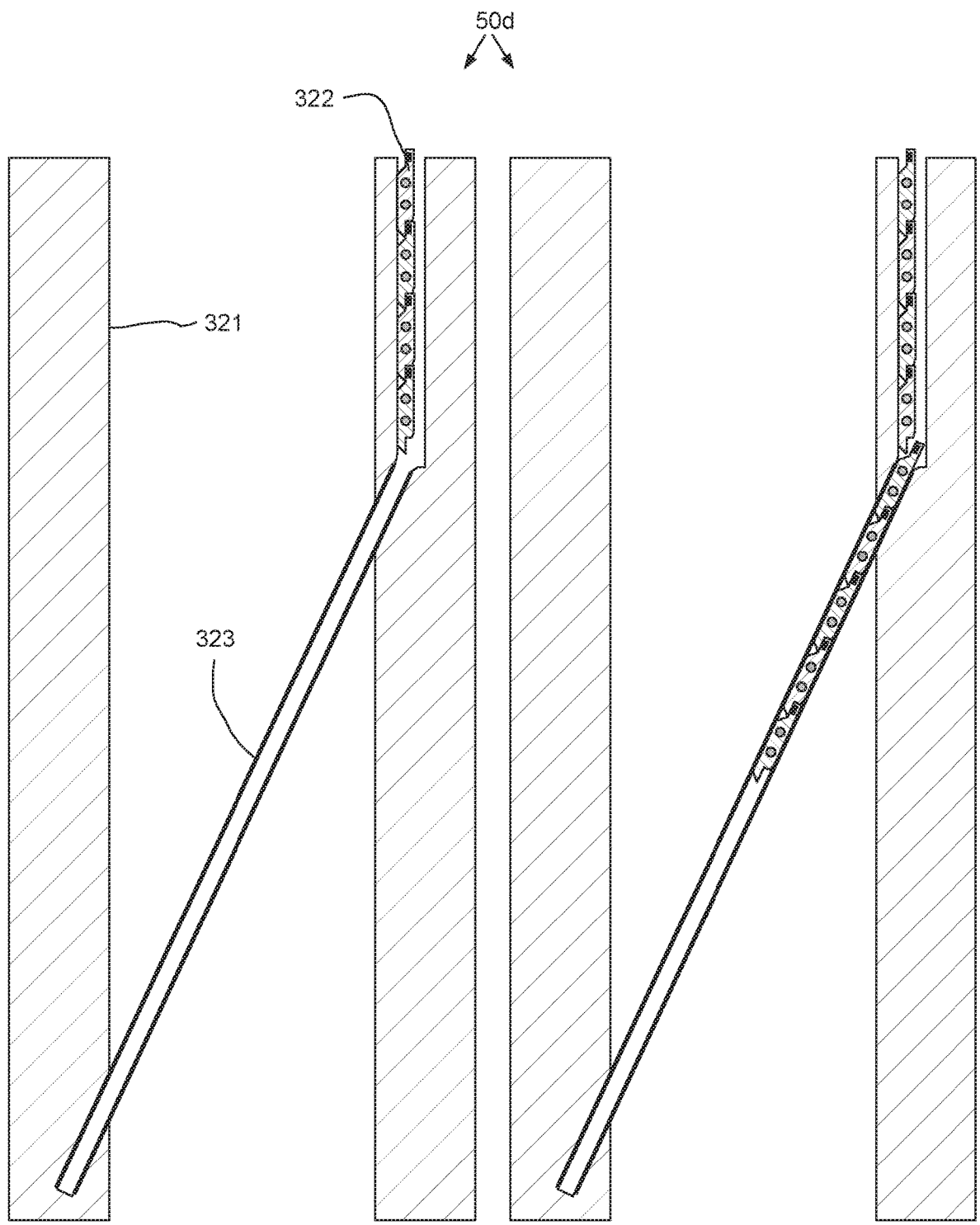
FIGS. 11A-11I illustrate an alternative isolation valve, according to another embodiment of the present disclosure.
Figures 11C, 11D, 11E, 11F:
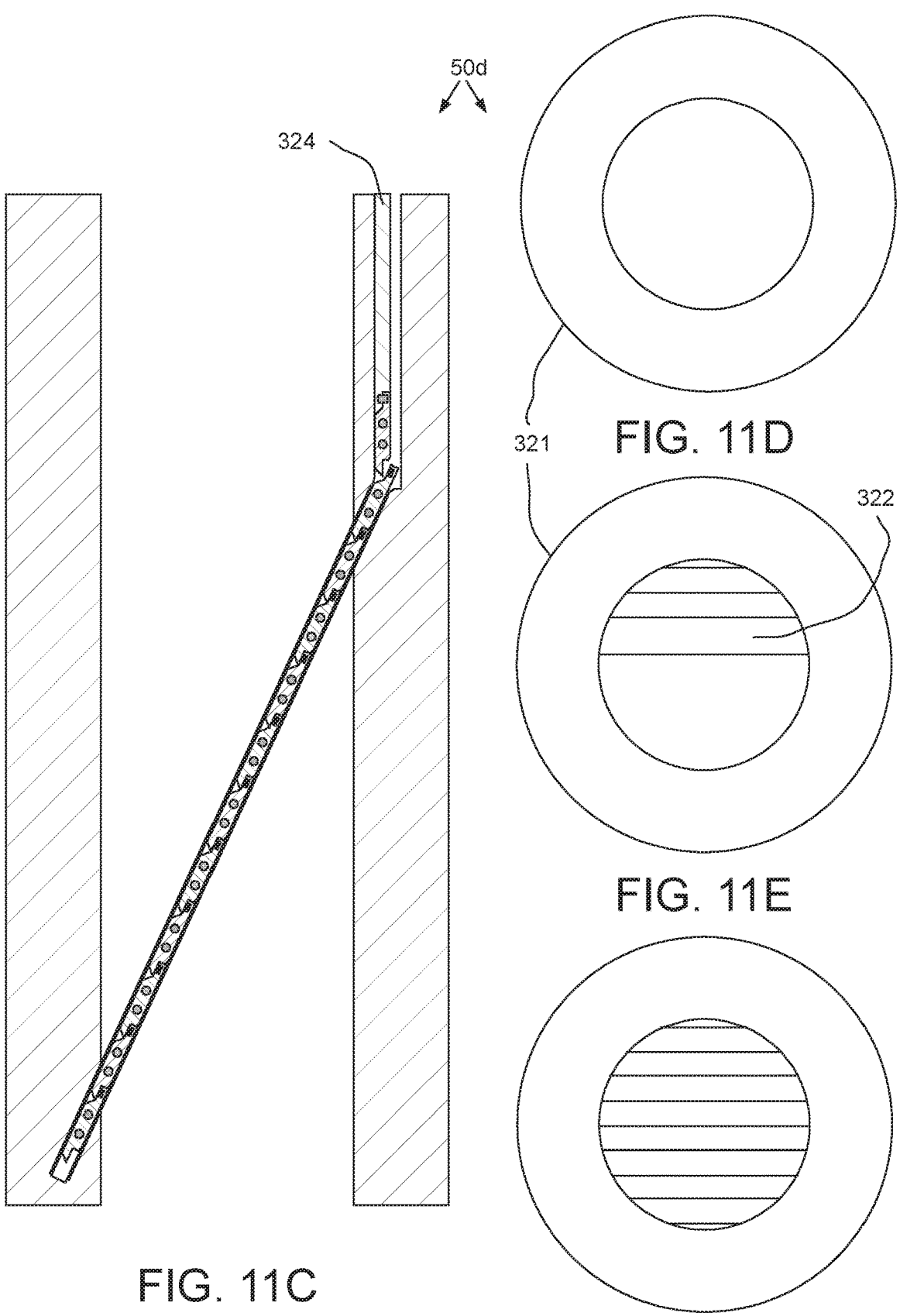
Figure 11G:
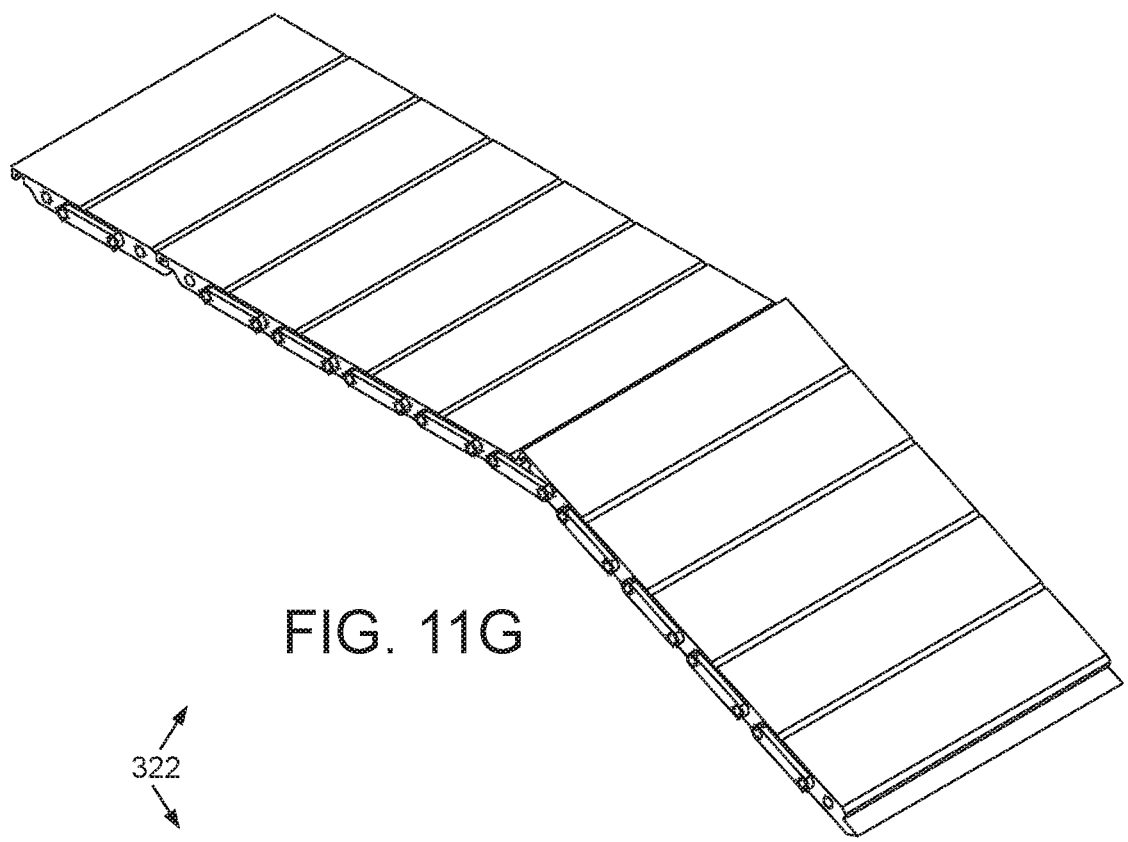
Figure 11H:
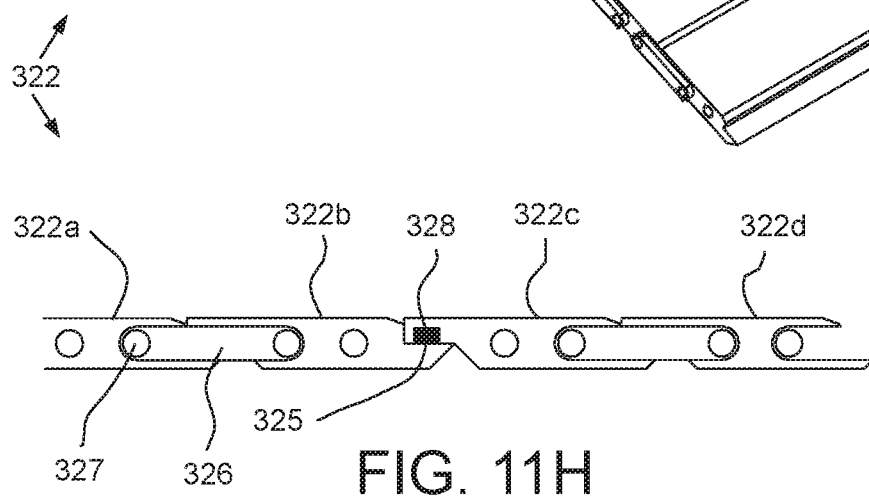
Figure 11I:
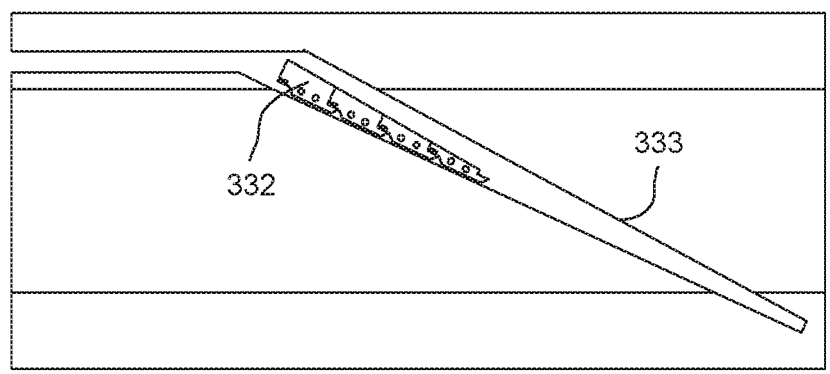

FIGS. 9A and 9B illustrate the isolation valve 50*b*. The isolation valve 50*b* may include a tubular housing 251, one or more openers, such as an upper flow tube and a lower flow tube, an upper flapper, a lower flapper, one or more seats, such as upper seat and lower seat, an upper receiver, a lower receiver, and the one or more sensor subs, such as upper sensor sub 282*u* and lower sensor sub 282*b*. The isolation valve 50*b* may be similar to the isolation valve 50*a* except for addition of the sensor subs 282*u,b*.

FIG. 9C illustrates the upper sensor sub 282*u*. The upper sensor sub 282*u* may include the housing 251*a*, one or more pressure sensors 283*u,b*, an electronics package 284, one or more antennas 285*r,t*, a power source, such as battery 286, and one or more position sensors, such as an open sensor 280*o*, 281*o* and a closed sensor 280*c*, 281*c*. The components 283-286 may be in electrical communication with each other by leads, a bus, or integration on a printed circuit board. The antennas 285*r,t* may include an outer antenna 285*r* and an inner antenna 285*t*. The housing 251*a* may include two or more tubular sections 287*u,b* connected to each other, such as by threaded couplings. The housing 251*a* may have couplings, such as threaded couplings, formed at a top and bottom thereof for connection to the upper housing section 81*a* and another component of the casing string 111.

The housing 251*a* may have a pocket formed between the sections 287*u,b* thereof for receiving the electronics package 284, the battery 286, and the inner antenna 285*t*. To avoid interference with the antennas 285*r,t*, the housing 251*a* may be made from a diamagnetic or paramagnetic metal or alloy, such as austenitic stainless steel or aluminum. The housing 251*a* may have a socket formed in an inner surface thereof for receiving the upper pressure sensor 283*u* such that the sensor is in fluid communication with the valve bore upper portion and one of the seats (upper seat shown) may have a socket formed in an inner surface thereof for receiving an intermediate pressure sensor 283*b* such that the sensor is in fluid communication with the valve bore portion between the flappers.

The electronics package 284 may include a control circuit 284*c*, a transmitter circuit 284*t*, and a receiver circuit 284*r*. The control circuit 284*c* may include a microcontroller (MCU), a data recorder (MEM), a clock (RTC), and an analog-digital converter (ADC). The data recorder may be a solid state drive. The transmitter circuit 284*t* may include an amplifier (AMP), a modulator (MOD), and an oscillator (OSC). The receiver circuit 284*r* may include the amplifier (AMP), a demodulator (MOD), and a filter (FIL). Alternatively, the transmitter 284*t* and receiver 284*r* circuits may be combined into a transceiver circuit.

Each position sensor may include a respective proximity sensor 280*c,o* and a respective target 281*c,o*. Each target 281*c,o* may be made from a magnetic material or permanent magnet. The closed target 281*c* may be bonded to an outer surface of the upper flapper and the open target 281*o* may be connected to the upper flow tube by being bonded or press fit into a groove formed in an outer surface of the sleeve portion thereof. The upper flow tube may be made from diamagnetic or paramagnetic material. Each proximity sensor 280*c,o* may or may not include a biasing magnet depending on whether the respective target 281*c,o* is a permanent magnet. Each proximity sensor 280*c,o* may include a semiconductor and may be in electrical communication with the control circuit 284*c* for receiving a regulated current. Each proximity sensor 280*c,o* and/or respective target 281*c,o* may be oriented so that the magnetic field generated by the biasing magnet/permanent magnet target is perpendicular to the current. Each proximity sensor 280*c,o* may further include an amplifier for amplifying the Hall voltage output by the semiconductor when the respective target 281*c,o* is in proximity to the sensor.

The lower sensor sub 282*b* may include the housing 251*d* having sections 288*u,b*, the (lower) pressure sensor, the electronics package, the antennas, the battery, and the position sensors.

Alternatively, the power source may be capacitor (not shown). Additionally, the upper sensor sub may include a temperature sensor (not shown). Alternatively, the inner antenna 285*t* may be omitted from the lower sensor sub 282*b*. Alternatively, the proximity sensors may be inductive, capacitive, optical, or utilize wireless identification tags.

Once the casing string 111 has been deployed and cemented into the wellbore 108, the sensor subs 282*u,b* may commence operation. Raw signals from the respective sensors 283*u,b*, 280*c,o*, 281*c,o* may be received by the respective converter, converted, and supplied to the controller. The controller may process the converted signals to determine the respective parameters, time stamp and address stamp the parameters, and send the processed data to the respective recorder for storage during tag latency. The controller may also multiplex the processed data and supply the multiplexed data to the respective transmitter 284*t*. The transmitter 284*t* may then condition the multiplexed data and supply the conditioned signal to the antenna 285*t* for electromagnetic transmission, such as at radio frequency. Since the lower sensor sub 282*b* is inaccessible to the tag 290 when the flapper 54 is closed, the lower sensor sub may transmit its data to the upper sensor sub 282*u* via its transmitter circuit and outer antenna and the upper sensor sub may receive the bottom data via its outer antenna 285*r* and receiver circuit 284*r*. The upper sensor sub 282*u* may then transmit its data and the bottom data for receipt by the tag 290.

Alternatively, the isolation valve 50 may be modified to include the sensor subs 282*u,b*. Alternatively, any of the other isolation valves 50, 50*a* may be assembled as part of the casing string 111 instead of the isolation valve 50*b*.

FIG. 9D illustrates the RFID tag 290 for communication with the upper sensor sub 282*u*. The RFD tag 290 may be a wireless identification and sensing platform (WISP) RFID tag. The tag 290 may include an electronics package and one or more antennas housed in an encapsulation. The tag components may be in electrical communication with each other by leads, a bus, or integration on a printed circuit board. The electronics package may include a control circuit, a transmitter circuit, and a receiver circuit. The control circuit may include a microcontroller (MCU), the data recorder (MEM), and a RF power generator.

Alternatively, each RFID tag may be an active tag having an onboard battery powering a transmitter instead of having the RF power generator or the WISP tag may have an onboard battery for assisting in data handling functions.

Once the lower formation 22*b* has been drilled to total depth (or the bit requires replacement), the drill string 105 may be raised from the lower formation. The drill string 105 may be raised until the drill bit is above the upper flapper 54*u* and the shifting tool 150 is aligned with the closer DHPU 200*c*. The PLC 21 may then operate the plug launcher 131*b* and the ball 140 may be pumped to the shifting tool 150, thereby engaging the shifting tool with the closer DHPU 200*c*. The drill string 105 may then be rotated 4 by the top drive 13 to close the upper and lower flappers of the isolation valve 50b. The ball 140 may be released to the ball catcher.

Once the flappers have closed, the choke valve 20 may be relaxed to remove backpressure exerted on the lower formation 22b during drilling. The PLC 21 may then operate the tag launcher 131t and the tag 290 may be pumped down the drill string 105. Once the tag 290 has been circulated through the drill string 105, the tag may exit the drill bit in proximity to the sensor sub 282u. The tag 290 may receive the data signal transmitted by the sensor sub 282u, convert the signal to electricity, filter, demodulate, and record the parameters. The tag 290 may continue through the wellhead 110, the PCA 101p, and the riser 125 to the RCD 126. The tag 290 may be diverted by the RCD 236 to the return line 129. The tag 290 may continue from the return line 129 to the tag reader 132.

The tag reader 132 may include a housing, a transmitter circuit, a receiver circuit, a transmitter antenna, and a receiver antenna. The housing may be tubular and have flanged ends for connection to other members of the return line 129. The transmitter and receiver circuits may be similar to those of the sensor sub 282u. The tag reader 132 may transmit an instruction signal to the tag 290 to transmit the stored data thereof. The tag 290 may then transmit the data to the tag reader 132. The tag reader 132 may then relay the data to the PLC 21. The PLC 21 may then confirm closing of the valve 50b. The tag 290 may be recovered from the shale shaker 26 and reused or may be discarded.

Alternatively, the tag reader 132 may include a combined transceiver circuit and/or a combined transceiver antenna. Alternatively, the tag reader 132 may be located subsea in the PCA 101p and may relay the data to the PLC 21 via the umbilical 117.

Once closing of the isolation valve 50b has been verified, an upper portion of the wellbore 108 (above the upper flapper) may then be vented to atmospheric pressure. The drill string 105 may be raised by removing one or more stands of drill pipe from the conveyor string 5p. A bearing assembly running tool (BART) (not shown) may be assembled as part of the drill string 105 and lowered into the RCD 126 by adding one or more stands to the drill string 105. The (BART) may be operated to engage the RCD bearing assembly and the RCD latch operated to release the RCD bearing assembly. The RCD bearing assembly may then be retrieved to the rig 1r by removing stands from the drill string 105 and the BART removed from the drill string. Retrieval of the drill string 105 to the rig 1r may then continue.

Additionally, a second tag may be launched before opening of the isolation valve 50b to ensure pressure has been equalized across the flappers.

FIGS. 10A-10K illustrate an alternative isolation valve 50c, according to another embodiment of the present disclosure. The isolation valve 50c may include a tubular housing 301, a disk 302, a cam 304, and a piston 305. The disk 302 may be formed by a plurality of wedges 302a-f movable by the piston 305 and cam 304 between an extended position and a retracted position. When extended, the wedges 302a-f may mate to create the solid disk 302 that bidirectionally closes a bore of the isolation valve 50c.

The wedges 302a-f may be of significant length to hold differential pressure and may provide dropped object protection. An interface between each wedge 302a-f and the housing 301 may be isolated by a respective seal. Each wedge 302a-f may have a sealing profile, such as alternating teeth 308 and grooves 309. The profiles may be arranged in a complementary fashion such that engagement of the profiles forms a metal to metal seal between the extended wedges. Alternatively, each wedge 303a,b may have a face coated by a seal 310, such as an elastomer or elastomeric copolymer. Alternatively, each wedge (not shown) may be made from the elastomer or elastomeric copolymer.

The wedges 302a-f may move between the extended and retracted positions by interaction with the cam 304. The cam 304 may include a rod 304a-f for each wedge 302a-f. The wedges 302a-f may be pivotally connected to the housing 301. The piston 305 and the rods 304a-f may be longitudinally movable relative to the housing 301 and the wedges 302a-f between an upper position and a lower position by fluid communication between the piston and opener and closer passages (not shown) of the housing 301. The rods 304a-f may be connected to the piston 305, such as by fasteners (not shown).

Each rod 304a-f may have a guide profile, such as a track 306, formed in an along an inner surface thereof. A thickness of each road 304a-f may also taper from a greater thickness adjacent to the piston 305 to a lesser thickness distal from the piston. Each wedge 302a-f may have a tongue 307 formed in an outer surface thereof and the tongue may be received in a respective track 306, thereby linking each wedge to a respective rod 304a-f. To close the isolation valve 50c, the piston 305 and rods 304a-f are moved toward the lower position, thereby extending the wedges 302a-f into engagement to form the disk 302. To open the isolation valve 50c, the piston 305 and rods 304a-f are moved toward the upper position, thereby retracting the wedges 302a-f from the bore of the isolation valve into respective pockets formed in an inner surface of the housing 301.

FIGS. 11A-11I illustrate an alternative isolation valve 50d, according to another embodiment of the present disclosure. The isolation valve 50d may include a tubular housing 321, a valve member 322, a seat 323, and a piston 324. The seat 323 may include an inclined track formed in an inner surface of the housing 321 and a seal disposed in the track, such as by molding. The seal may be made from an elastomer or elastomeric copolymer. The valve member 322 may include a plurality of sections 322a-d (twelve shown) pivotally connected to each other, such as by links 326. Each link 326 may be connected to adjacent sections, such as by fasteners 327. Each section 322a-d may carry a seal 328 at an upper end thereof and have a seal face 325 formed at a lower end thereof for isolating the interfaces between the sections. Each section 322a-d may be rectangular.

The piston 324 may be connected to an upper end of the valve member 322, such as by a fastener. The piston 324 may be longitudinally movable relative to the housing 321 between an upper position and a lower position by fluid communication between the piston and opener and closer passages (not shown) of the housing 321. The valve member 322 may move between an extended position and a retracted position by interaction with the seat 323. When extended, the valve member 322 may engage the seat 323, thereby bidirectionally closing a bore of the isolation valve 50d. As the piston 324 moves from the upper position toward the lower position, the sections 322a-d may articulate as the sections are pushed into and along the seat track, thereby compressing the seat seal. During the movement, the sections 322a-d may also be compressed, thereby energizing the section seals 328.

The closed sections 322a-d may provide dropped object protection.

Alternatively, each section and/or the seat may be arcuate. Alternatively, the valve member may be driven into the seat mechanically, such as by a shifting tool of the drill string.

Alternatively, the sections 332 and track 333 may each be tapered, thereby obviating the need of a seat seal. As the sections 332 are driven into the track 333, the sections are wedged into engagement with the track, thereby forming a metal to metal seal.

Either of the isolation valves 50c,d may be used with either of the drilling systems 1, 101. Alternatively, either isolation valve 50c,d may be modified to include the sensor subs 282u,b.

Alternatively, any of the isolation valves 50, 50a-d may include an electric or electro-hydraulic actuator for opening and/or closing the valve member(s) thereof instead of being operated by control lines. The actuated isolation valve may further include an electronics package, a battery, and a receiver, such as an antenna or pressure sensor. The actuated isolation valve may be operated by sending a wireless command signal to the receiver, such as by mud pulse, electromagnetic telemetry, or radio frequency identification tag.

Alternatively, each or both DHPUs may be replaced by one or more alternative DHPUs. Each alternative DHPU may include a pump, an electronics package, a battery, and a receiver, such as an antenna or pressure sensor. The alternative DHPU may be operated by sending a wireless command signal to the receiver, such as by mud pulse, electromagnetic telemetry, or radio frequency identification tag. Alternatively or additionally to the battery, each DHPU may be powered wirelessly from a power coupling carried by the drill string or include a mechanism for harnessing energy from fluid in the wellbore.

In one embodiment, an isolation valve for use in a wellbore includes a tubular housing; a plurality of closure members pivotally coupled to the tubular housing, wherein the plurality of closure members are movable between an open position and a closed position; and a sealing member disposed between two adjacent closure members.

In one or more embodiments disclosed herein, sealing member comprises an elastomer or an elastomeric copolymer.

In one or more embodiments disclosed herein, the sealing member comprises sealing profile formed on the plurality of closure members.

In one or more embodiments disclosed herein, the sealing profile comprises alternating teeth and grooves formed on each of the plurality of closure members.

In one or more embodiments disclosed herein, the sealing member comprises a metal to metal seal.

In one or more embodiments disclosed herein, the plurality of closure members are made of an elastomer or an elastomeric copolymer.

In one embodiment, an isolation valve for use in a wellbore includes a tubular housing; a plurality of wedges disposed in the housing and pivotable relative thereto between an open position and a closed position; a cam having a plurality of rods, each rod linked to a respective wedge; and a piston operable to longitudinally move the cam relative to the wedges.

In one or more embodiments disclosed herein, each wedge is made from a metal or alloy has alternating teeth and grooves to form a metal to metal seal between the wedges in the closed position.

In one or more embodiments disclosed herein, each wedge has a seal face coated with an elastomer or elastomeric copolymer.

In one or more embodiments disclosed herein, each wedge is made from an elastomer or elastomeric copolymer.

In one or more embodiments disclosed herein, each rod has a track formed along an inner surface thereof, a thickness of each rod tapers from a greater thickness adjacent to the piston to a lesser thickness distal from the piston, and each wedge may have tongue received in the respective track.

In another embodiment, an isolation assembly for use in a wellbore includes an isolation valve disclosed herein; a DHPU for opening and/or closing the isolation valve and having a tubular housing having a bore formed therethrough; a tubular mandrel disposed in the DHPU housing, movable relative thereto, and having a profile formed through a wall thereof for receiving a driver of a shifting tool; and a piston operably coupled to the mandrel and operable to pump hydraulic fluid to the valve piston.

In another embodiment, an isolation valve for use in a wellbore includes a tubular housing; a track formed in an inner surface of the housing; a valve member having a plurality of sections pivotally connected to each other; and a piston operable to push the sections into engagement with and along the track.

In one or more embodiments disclosed herein, the isolation valve includes a seal molded into the track.

In one or more embodiments disclosed herein, the isolation valve includes links and fasteners pivotally connecting each section to adjacent sections; each section carries a seal at a first end thereof; and each section has a seal face formed at a second end thereof.

In one or more embodiments disclosed herein, each section is rectangular.

In one or more embodiments disclosed herein, the track and each section are made from a metal or alloy and are tapered to form a metal to metal seal.

While the foregoing is directed to embodiments of the present disclosure, other and further embodiments of the disclosure may be devised without departing from the basic scope thereof, and the scope of the present invention is determined by the claims that follow.

The invention claimed is:

1. A method of drilling a wellbore, comprising:
deploying a drill string into the wellbore through a casing string disposed in the wellbore, the casing string having an isolation valve;
drilling the wellbore into a formation by injecting drilling fluid through the drill string and rotating a drill bit of the drill sting;
retrieving the drill string from the wellbore until the drill bit is above a plurality of valve members of the isolation valve, wherein the plurality of valve members includes an upper valve member and a lower valve member; and
closing the valve members, wherein the upper valve member is compressed against an upper seat of the isolation valve in response to fluid pressure in an upper portion of the wellbore being greater than fluid pressure in a lower portion of the wellbore, and the lower valve member is pressed against a lower seat of the isolation valve in response to the fluid pressure in the wellbore lower portion being greater than the fluid pressure in the wellbore upper portion, thereby bidirectionally isolating the formation from an upper portion of the wellbore.

2. The method of claim 1, wherein the upper and lower valve members are an upper flapper and a lower flapper, respectively.

3. The method of claim 2, wherein the lower flapper is closed before the upper flapper is closed.

4. The method of claim 2, wherein a closing chamber is formed in the isolation valve during closing of at least one of the flappers to facilitate closing of the at least one flapper.

5. The method of claim 2, wherein:
the lower flapper is closed by supplying hydraulic fluid to a closer line connected to the isolation valve and relieving an opener line connected to the isolation valve, and
the upper flapper is closed by supplying the hydraulic fluid to the closer line and relieving the opener line.

6. The method of claim 5, wherein:
the casing string further has a downhole hydraulic power unit (DHPU) in fluid communication with the closer line,
the drill string further has a shifting tool, and
the hydraulic fluid is supplied to the closer line by driving the DHPU with the shifting tool.

7. A method of drilling a wellbore, comprising:
deploying a drill string into the wellbore through a casing string disposed in the wellbore, the casing string having an isolation valve;
drilling the wellbore into a formation by injecting drilling fluid through the drill string and rotating a drill bit of the drill sting;
retrieving the drill string from the wellbore until the drill bit is above a first valve member and a second valve member of the isolation valve;
closing the first valve member using a first piston to isolate fluid pressure from a first direction;
closing the second valve member using a second piston to isolate fluid pressure from a second direction opposite the first direction, thereby bidirectionally isolating the formation from an upper portion of the wellbore.

8. The method of claim 7, wherein the first valve member is closed using a closer line.

9. The method of claim 8, wherein the closer line are in fluid communication with the first piston and the second piston.

10. The method of claim 8, wherein closing the first valve member comprising supplying fluid from the closer line to the first piston while restricting fluid flow to the second piston.

11. The method of claim 8, wherein the first valve member is closed before the second valve member.

12. A method of drilling a wellbore, comprising:
deploying a drill string into the wellbore through a casing string disposed in the wellbore, the casing string having an isolation valve;
drilling the wellbore into a formation by injecting drilling fluid through the drill string and rotating a drill bit of the drill sting;
retrieving the drill string from the wellbore until the drill bit is above one or more valve members of the isolation valve, wherein at least one of the one or more valve members includes a plurality of wedges pivotable between an open position and a closed position and wherein the plurality of wedges are circumferentially spaced inside the casing string; and
closing the one or more valve members by using a piston to pivot more than two adjacent wedges of the plurality of wedges into engagement with each other, wherein the more than two wedges together form a disk that bidirectionally isolates the formation from an upper portion of the wellbore.

13. The method of claim 12, wherein:
the plurality of wedges are closed by supplying hydraulic fluid to a closer line connected to the isolation valve and relieving an opener line connected to the isolation valve,
the casing string further has a downhole hydraulic power unit (DHPU) in fluid communication with the closer line,
the drill string further has a shifting tool, and
the hydraulic fluid is supplied to the closer line by driving the DHPU with the shifting tool.

14. The method of claim 12, wherein closing the one or more valve members comprises simultaneously pivoting the plurality of wedges to the closed position.

15. The method of claim 12, further comprising a sealing member disposed between the two adjacent wedges.

* * * * *